(12) United States Patent
Iida et al.

(10) Patent No.: US 7,694,508 B2
(45) Date of Patent: Apr. 13, 2010

(54) AIR-FUEL RATIO CONTROL SYSTEM FOR INTERNAL COMBUSTION ENGINE

(75) Inventors: Jun Iida, Wako (JP); Yukio Suehiro, Wako (JP); Hidetaka Maki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 595 days.

(21) Appl. No.: 11/717,669

(22) Filed: Mar. 14, 2007

(65) Prior Publication Data

US 2007/0227121 A1 Oct. 4, 2007

(30) Foreign Application Priority Data

Apr. 3, 2006 (JP) ............................. 2006-101503

(51) Int. Cl.
*F01N 3/00* (2006.01)

(52) U.S. Cl. .............................. 60/285; 60/276; 60/277; 60/274

(58) Field of Classification Search ................... 60/274, 60/277, 276, 285
See application file for complete search history.

(56) References Cited

FOREIGN PATENT DOCUMENTS

| JP | 05-195842 A | 8/1993 |
|---|---|---|
| JP | 2001-234784 A | 8/2001 |

*Primary Examiner*—Thomas E Denion
*Assistant Examiner*—Michael Carton
(74) *Attorney, Agent, or Firm*—Arent Fox LLP

(57) ABSTRACT

Air-fuel ratio control system for an engine having a catalyst purifying exhaust gases, first oxygen sensor disposed upstream of the catalyst, and second oxygen sensor disposed downstream. Intake air flow rate is detected. An amount of oxygen flowing into the catalyst is calculated using oxygen concentration detected by the first sensor and the detected intake air flow rate. The air-fuel ratio is alternately controlled to lean and rich by comparison between the calculated oxygen amount and target values. A rich oxygen amount and a lean oxygen amount are calculated. A correction amount for correcting the first sensor output is calculated based on the rich oxygen amount, the lean oxygen amount, and an accumulated value of the detected intake air flow rate. The oxygen concentration corrected with the correction amount is used for calculating the inflowing oxygen amount, the rich operation oxygen amount, and the lean operation oxygen amount.

12 Claims, 14 Drawing Sheets

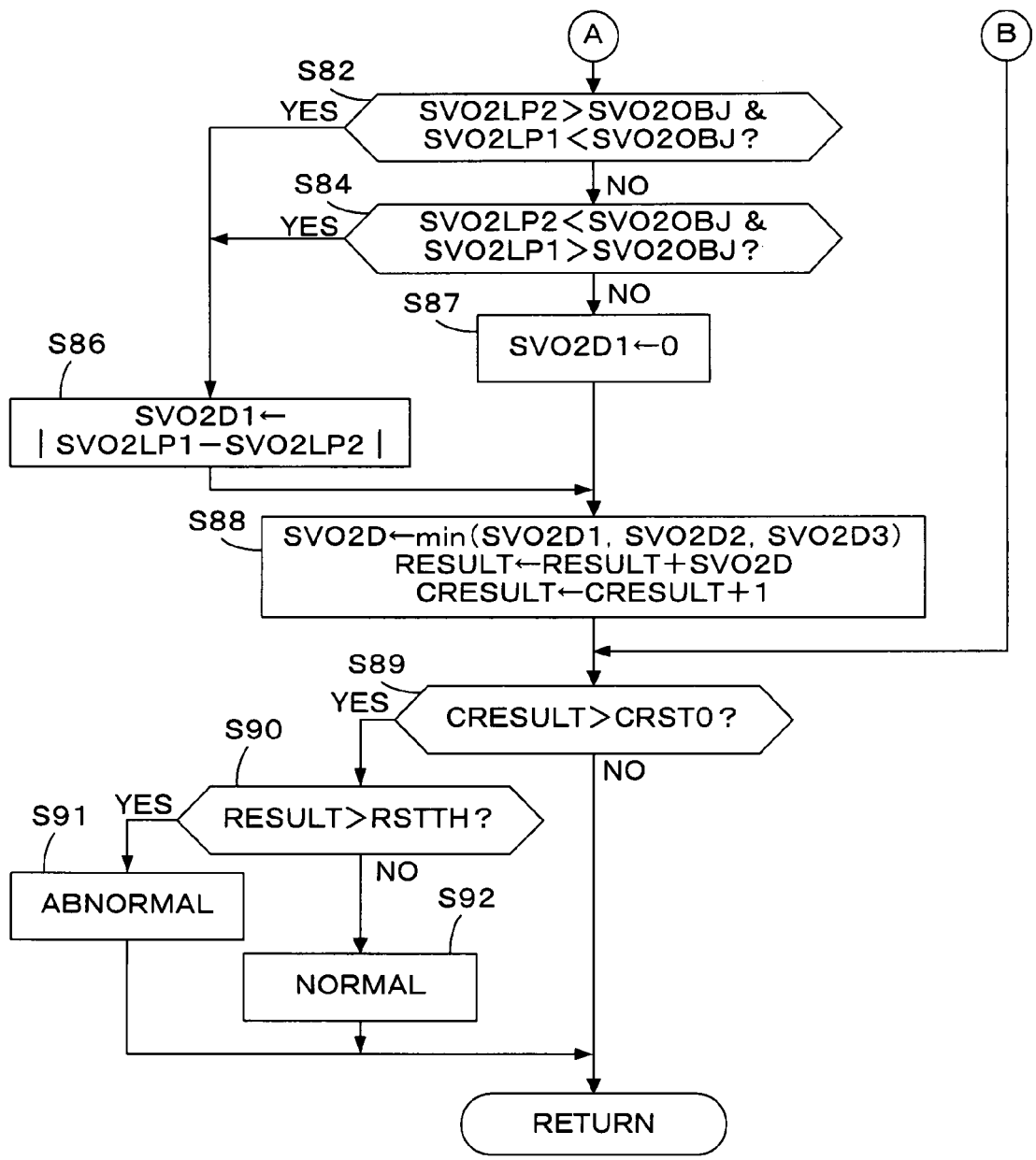

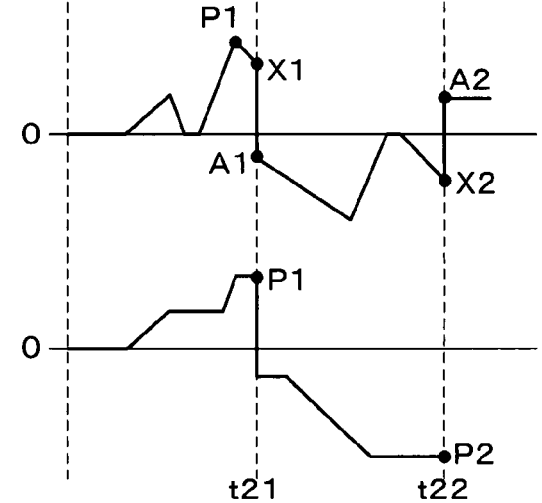
FIG. 16A SVO2
FIG. 16B KACT
FIG. 16C OSSVO2
FIG. 16D OSCSVO2
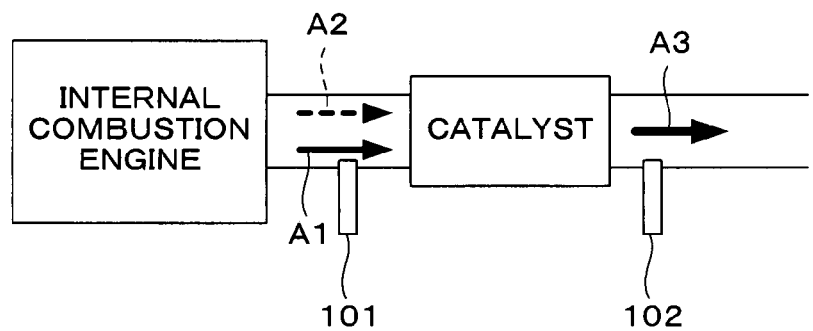
FIG. 17

AIR-FUEL RATIO CONTROL SYSTEM FOR INTERNAL COMBUSTION ENGINE

BACKGROUND OF THE INVENTION

1. Field of the Invention

The present invention relates to an air-fuel ratio control system for an internal combustion engine and, particularly, to a control system for controlling an air-fuel ratio of an air-fuel mixture supplied to the internal combustion engine provided with a catalyst in the exhaust system for purifying the exhaust gases.

2. Description of the Related Art

Japanese Patent Laid-open No. H05-195842 (JP-'842) discloses an air-fuel ratio control system for an internal combustion engine provided with a catalyst in the exhaust system. According to this disclosure, an actual oxygen charged degree of the catalyst is compared with a target oxygen charged degree, and the air-fuel ratio is controlled to be richer when the actual oxygen charged degree is greater than the target oxygen charged degree, while the air-fuel ratio is controlled to be leaner when the actual oxygen charged degree is less than the target oxygen charged degree. This control makes it possible to always maintain an appropriate oxygen charged degree to obtain good exhaust characteristics.

In the above conventional system, the actual oxygen charged degree is calculated according to the intake air flow rate of the engine and an output of the air-fuel ratio sensor provided upstream of the catalyst. Accordingly, the calculated value of the actual oxygen charged degree is influenced by differences or aging in the detection characteristics of the air-fuel ratio sensor. In order to reduce such an influence, JP-'842 discloses a method for calculating an average value of an output of an air-fuel ratio sensor provided downstream of the catalyst and an average value of the output of the air-fuel ratio sensor provided upstream of the catalyst and correcting the output of the upstream air-fuel ratio sensor according to a ratio of the two average values.

However, the oxygen concentration of exhaust gases in the vicinity of each of these air-fuel ratio sensors may become different from each other due, for example, to a change in the engine operating condition, to the configuration of the exhaust pipe, or to the mounted positions of the upstream air-fuel ratio sensor and downstream air-fuel ratio sensor. The difference in oxygen concentrations may cause a change in the mutual relationship between the outputs of the two air-fuel ratio sensors in a short time period.

For example, in a high-load operating condition of the engine, the velocity of exhaust gases increases, and the oxygen concentration in the exhaust flow shown by the solid line A1 in FIG. 17 may slightly deviate from the oxygen concentration in the exhaust flow shown by the broken line A2. In this example, the upstream air-fuel ratio sensor 101 detects an oxygen concentration in the exhaust flow shown by the solid line A1. On the other hand, on the downstream side of the catalyst, the exhaust flows shown by the solid line A1 and the broken line A2 on the upstream side are mixed to create the exhaust flow shown by the thick solid line A3. Thus, the downstream air-fuel ratio sensor detects an oxygen concentration in the exhaust flow (A3). Therefore, the outputs of the two sensors differ from each other even if the detection characteristics of the two air-fuel ratio sensors 101 and 102 are completely identical.

The method disclosed in JP-'842 cannot appropriately deal with the deviation in the outputs of two sensors that is caused in a short time period due to the change in the engine operating condition.

SUMMARY OF THE INVENTION

The present invention was made contemplating the above-described situation. An aspect of the present invention is to provide an air-fuel ratio control system that maintains good exhaust characteristics by appropriately controlling the oxygen concentration of exhaust gases flowing into the exhaust purifying catalyst and by accurately correcting not only differences or aging in the characteristics of the oxygen concentration (air-fuel ratio) sensor but also the deviation in the detected value caused in a relatively short time period.

To attain the above-described aspect, the present invention provides an air-fuel ratio control system for an internal combustion engine having a catalyst provided in an exhaust system of the engine for purifying exhaust gases. The air-fuel ratio control system controls an air-fuel ratio of an air-fuel mixture supplied to the engine and includes an intake air flow rate detecting means, a first oxygen concentration sensor disposed upstream of the catalyst, a second oxygen concentration sensor disposed downstream of the catalyst, inflowing oxygen amount calculating means, air-fuel ratio switching control means, rich operation oxygen amount calculating means, lean operation oxygen amount calculating means, and correction amount calculating means. The intake air flow rate detecting means detects an intake air flow rate (GAIR) of the engine. The inflowing oxygen amount calculating means calculates an amount (OS) of oxygen flowing into the catalyst according to an oxygen concentration (KACT) detected by the first oxygen concentration sensor and the intake air flow rate (GAIR) detected by the intake air flow rate detecting means. The air-fuel ratio switching control means alternately controls the air-fuel ratio to a lean air-fuel ratio (KCMDL) which is leaner than the stoichiometric ratio and a rich air-fuel ratio (KCMDH) which is richer than the stoichiometric ratio according to a result of comparison between the inflowing oxygen amount (OS) calculated by the inflowing oxygen amount calculating means and target values (OSOBJR, OSOBJL) of the inflowing oxygen amount. The rich operation oxygen amount calculating means calculates a rich operation oxygen amount (OSCR) which indicates an amount of oxygen flowing into the catalyst during a time period from when the time the oxygen concentration (KACT) detected by the first oxygen concentration sensor changes to a value indicative of a rich air-fuel ratio which is richer than the stoichiometric ratio to the time when an output (SVO2) of the second oxygen concentration sensor changes to a value indicative of the rich air-fuel ratio. The lean operation oxygen amount calculating means calculates a lean operation oxygen amount (OSCL) which indicates an amount of oxygen flowing into the catalyst during a time period from the time when the oxygen concentration detected by the first oxygen concentration sensor changes to a value indicative of a lean air-fuel ratio which is leaner than the stoichiometric ratio to the time when the output of the second oxygen concentration sensor changes to a value indicative of the lean air-fuel ratio. The correction amount calculating means calculates a correction amount (PO2C) for correcting the oxygen concentration detected by the first oxygen concentration sensor, based on the rich operation oxygen amount (OSCR), the lean operation oxygen amount (OSCL), and an accumulated value (GAIRSUM) obtained by accumulating the intake air flow rate detected by the intake air flow rate detecting means. The inflowing oxygen amount calculating means, the rich operation oxygen amount calculating means, and the lean operation oxygen amount calculating means use the oxygen concentration (KACTM) corrected with the correction amount (PO2C) to respectively calculate the inflowing oxygen amount (OS), the rich operation oxygen amount (OSCR), and the lean operation oxygen amount (OSCL).

According to the above-described configuration, the amount of oxygen flowing into the catalyst is calculated according to the oxygen concentration detected by the first oxygen concentration sensor and the intake air flow rate detected by the intake air flow rate detecting means. The air-fuel ratio is alternately controlled to the lean air-fuel ratio and the rich air-fuel ratio according to a result of comparison between the calculated inflowing oxygen amount and the target values of the inflowing oxygen amount. The rich operation oxygen amount, which indicates an amount of oxygen flowing into the catalyst during the time period from the time when the oxygen concentration detected by the first oxygen concentration sensor changes to a value indicative of the rich air-fuel ratio to the time when the output of the second oxygen concentration sensor changes to a value indicative of the rich air-fuel ratio, is calculated. Further, the lean operation oxygen amount, which indicates an amount of oxygen flowing into the catalyst during the time period from when the time the oxygen concentration detected by the first oxygen concentration sensor changes to a value indicative of the lean air-fuel ratio to the time when the output of the second oxygen concentration sensor changes to a value indicative of the lean air-fuel ratio, is calculated. The correction amount for correcting the oxygen concentration detected by the first oxygen concentration sensor is calculated based on the rich operation oxygen amount, the lean operation oxygen amount, and the accumulated value of the detected intake air flow rate. The inflowing oxygen amount, the rich operation oxygen amount, and the lean operation oxygen amount are calculated using the oxygen concentration corrected with the correction amount.

Therefore, the correction amount can be calculated at the time that the output of the second oxygen concentration sensor has twice turned over, and the oxygen concentration detected by the first oxygen concentration sensor can immediately be corrected with the calculated correction amount. Accordingly, the deviation of the detected oxygen concentration due to a change in the engine operating condition can be corrected immediately to accurately perform the air-fuel switching control. Consequently, the oxygen concentration in the exhaust gases can be controlled appropriately to maintain good exhaust characteristics.

Preferably, the air-fuel ratio control system further includes peak rich operation oxygen amount calculating means, peak lean operation oxygen amount calculating means, lean operation oxygen amount correcting means, and rich operation oxygen amount correcting means. The peak rich operation oxygen amount calculating means calculates a peak rich operation oxygen amount (OSCSVO2) which is a peak value of an amount of oxygen flowing into the catalyst during the time period from the time when the oxygen concentration (KACT) detected by the first oxygen concentration sensor changes to a value indicative of the rich air-fuel ratio to the time when the output (SVO2) of the second oxygen concentration sensor changes to a value indicative of the rich air-fuel ratio. The peak lean operation oxygen amount calculating means calculates a peak lean operation oxygen amount (OSCSVO2) which is a peak value of an amount of oxygen flowing into the catalyst during the time period from the time when the oxygen concentration (KACT) detected by the first oxygen concentration sensor changes to a value indicative of the lean air-fuel ratio to the time when the output (SVO2) of the second oxygen concentration sensor changes to a value indicative of the lean air-fuel ratio. The lean operation oxygen amount correcting means corrects the lean operation oxygen amount (OSCL) with the rich operation oxygen amount (OSCR) and the peak rich operation oxygen amount (OSCSVO2). The rich operation oxygen amount correcting means corrects the rich operation oxygen amount (OSCR) with the lean operation oxygen amount (OSCL) and the peak lean operation oxygen amount (OSCSVO2). The correction amount calculating means calculates the correction amount (PO2C) using the corrected rich operation oxygen amount and the corrected lean operation oxygen amount.

According to this configuration, the peak rich operation oxygen amount, which is a peak value of an amount of oxygen flowing into the catalyst during the time period from the time when the oxygen concentration detected by the first oxygen concentration sensor changes to a value indicative of the rich air-fuel ratio to the time when the output of the second oxygen concentration sensor changes to a value indicative of the rich air-fuel ratio, is calculated. The peak lean operation oxygen amount, which is a peak value of an amount of oxygen flowing into the catalyst during the time period from when the time the oxygen concentration detected by the first oxygen concentration sensor changes to a value indicative of the lean air-fuel ratio to the time when the output of the second oxygen concentration sensor changes to a value indicative of the lean air-fuel ratio, is calculated. The lean operation oxygen amount is corrected with the rich operation oxygen amount and the peak rich operation oxygen amount, and the rich operation oxygen amount is corrected with the lean operation oxygen amount and the peak lean operation oxygen amount.

Normally, the oxygen concentration detected by the first oxygen concentration sensor changes to a value indicative of lean or rich conditions after the output of the second oxygen concentration sensor changes to a value indicative of rich or lean operations. However, when the response characteristic of the second oxygen concentration sensor has deteriorated, the output of the second oxygen concentration sensor may sometimes change to a value indicative of rich or lean operations after the oxygen concentration detected by the first oxygen concentration sensor changes to a value indicative of lean or rich operations. Even in such case, accurate values of the rich operation oxygen amount and the lean operation oxygen amount can be obtained by correcting the lean operation oxygen amount with the rich operation oxygen amount and the peak rich operation oxygen amount and correcting the rich operation oxygen amount with the lean operation oxygen amount and the peak lean operation oxygen amount. Therefore, the oxygen concentration detected by the first oxygen concentration sensor can accurately be corrected with the calculated correction amount.

Preferably, the air-fuel ratio control system further includes deterioration detecting means for detecting a deterioration degree (RESULT) of the catalyst based on the output (SVO2) of the second oxygen concentration sensor during the operation of the air-fuel ratio switching control means.

With this configuration, the deterioration degree of the catalyst is detected based on the output of the second oxygen concentration sensor during the operation of the air-fuel ratio switching control means. That is, the deterioration degree of the catalyst is detected based on the output of the second oxygen concentration sensor in the condition where the air-fuel ratio switching control is accurately performed without being influenced by changes in the engine operating condition. Therefore, the deterioration degree of the catalyst can be detected more accurately.

Preferably, the air-fuel ratio switching control means changes a center air-fuel ratio of the air-fuel ratio switching control according to the correction amount (PO2C).

With this configuration, the center air-fuel ratio of the air-fuel ratio switching control is changed according to the correction amount. Therefore, the rich air-fuel ratio and the lean air-fuel ratio are appropriately set to a value corresponding to the oxygen concentration detected by the first oxygen concentration sensor, thereby maintaining the amount of oxygen flowing into the catalyst at a level which is almost equal to the amount of oxygen flowing out from the catalyst. Consequently, the period of inversion of the output of the second oxygen concentration sensor becomes longer, and any influence due to deterioration of the response characteristic of the second oxygen concentration sensor can be reduced.

Preferably, the air-fuel ratio control system further includes target value modifying means (FIG. 5, steps S16, S17) for timely modifying the target values of the inflowing oxygen amount so that an inversion of the output of the second oxygen concentration sensor occurs consecutively at least twice. The "inversion of the output of the second oxygen concentration sensor" means a change in the output of the second oxygen concentration sensor from a value indicative of the lean air-fuel ratio to a value indicative of the rich air-fuel ratio, or vice versa.

BRIEF DESCRIPTION OF THE DRAWINGS

FIGS. 14 and 15 are flowcharts of the deterioration determination process executed in the process of FIG. 4.

FIGS. 16A-16D are graphical representations of the time charts for explaining the correction method of the amount of oxygen flowing into the three-way catalyst; and FIG. 17 is a diagram illustrating the problem of the conventional technique.

DETAILED DESCRIPTION OF THE PREFERRED EMBODIMENTS

Preferred embodiments of the present invention will now be described with reference to the drawings.

Figure 1:
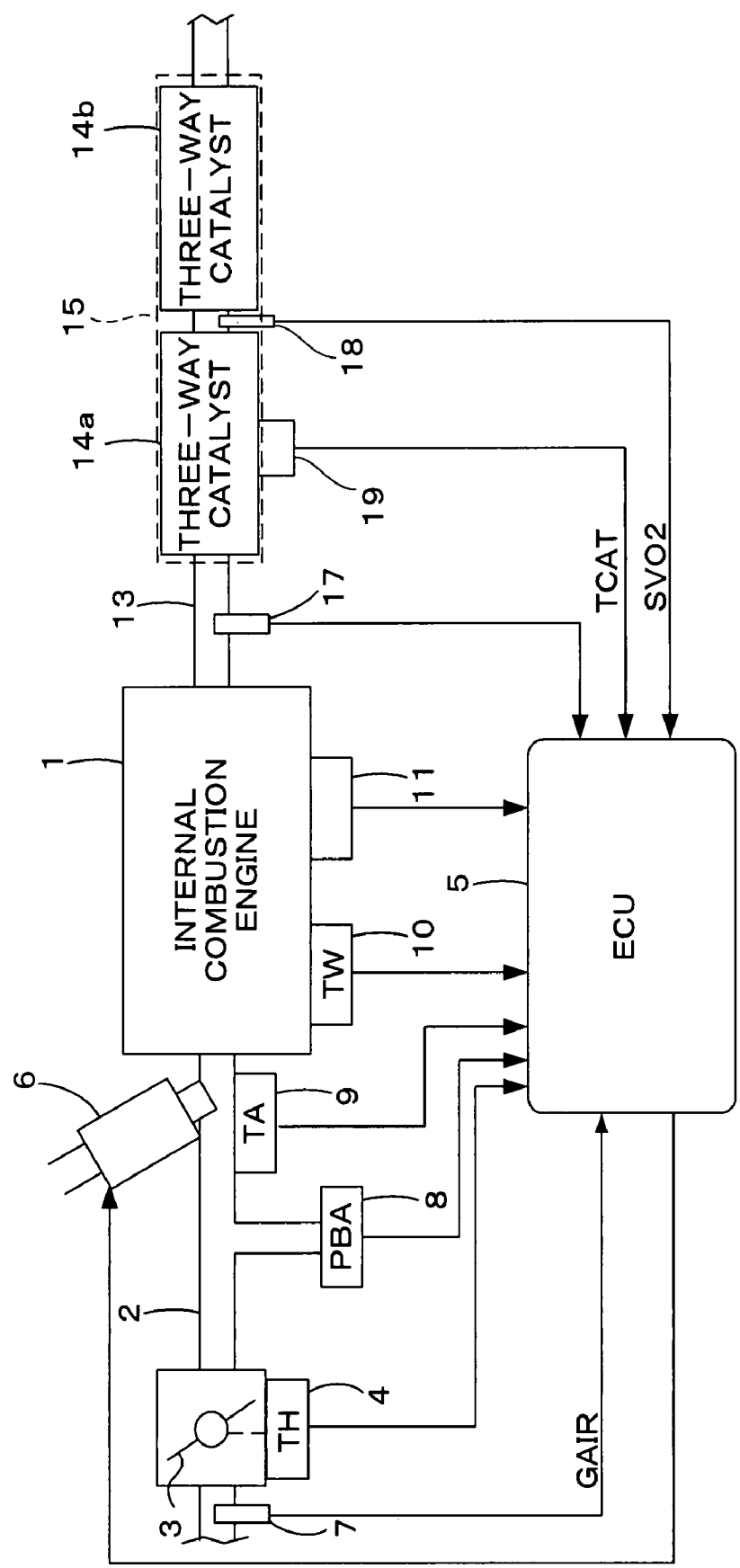
FIG. 1 is a schematic diagram of an internal combustion engine and an air-fuel ratio control system therefor according to one embodiment of the present invention.

FIG. 1 is a schematic diagram showing a general configuration of an internal combustion engine (hereinafter referred to as "engine") and an air-fuel ratio control system therefor according to one embodiment of the present invention. The engine 1 is, for example, a four-cylinder engine having an intake pipe 2 provided with a throttle valve 3. A throttle valve opening (TH) sensor 4 is connected to the throttle valve 3 to output an electrical signal according to the degree of opening of the throttle valve 3 and supply the electrical signal to an electronic control unit 5 (hereinafter referred to as "ECU").

Fuel injection valves 6 are inserted into the intake pipe 2 at locations intermediate between the cylinder block of the engine 1 and the throttle valve 3 and slightly upstream of the respective intake valves (not shown). These fuel injection valves 6 are connected to a fuel pump (not shown) and are electrically connected to the ECU 5. A valve opening period of each fuel injection valve 6 is controlled by a signal output from the ECU 5.

An intake air flow rate sensor 7 for detecting an intake air flow rate GAIR is provided upstream of the throttle valve 3. Further, an intake pressure sensor 8 for detecting an intake pressure PBA and an intake air temperature sensor 9 for detecting an intake air temperature TA are provided downstream of the throttle valve 3. The detection signals of these sensors are supplied to the ECU 5.

An engine coolant temperature (TW) sensor 10, such as a thermistor, is mounted on the body of the engine 1 to detect an engine coolant temperature TW (cooling water temperature). A temperature signal corresponding to the detected engine coolant temperature TW is output from the sensor 10 and supplied to the ECU 5.

A crank angle position sensor 11 for detecting a rotation angle of a crankshaft (not shown) of the engine 1 is connected to the ECU 5, and a signal corresponding to a detected rotation angle of the crankshaft is supplied to the ECU 5. The crank angle position sensor 11 includes a cylinder discrimination sensor which outputs a pulse (hereinafter referred to as "CYL pulse") at a predetermined crank angle position for a specific cylinder of the engine 1. The crank angle position sensor 11 also includes a top dead center (TDC) sensor which outputs a TDC pulse at a crank angle position before a TDC of a predetermined crank angle starts at an intake stroke in each cylinder (i.e., at every 180° crank angle in the case of a four-cylinder engine) and a crank angle (CRK) sensor for generating one pulse (hereinafter referred to as "CRK pulse") with a CRK period (e.g., a period of 30°, shorter than the period of generation of the TDC pulse). The CYL pulse, the TDC pulse and the CRK pulse are supplied to the ECU 5. The CYL, TDC and CRK pulses are used to control the various timings, such as a fuel injection timing and an ignition timing, and to detect an engine rotational speed NE.

The exhaust pipe 13 is provided with a catalyst unit 15 which is configured with one container containing two beds of three-way catalysts 14a and 14b.

The three-way catalysts 14a and 14b have oxygen storing capacity and store oxygen contained in the exhaust gases in the exhaust lean condition where the air-fuel ratio of the air-fuel mixture supplied to the engine 1 is lean with respect to the stoichiometric ratio, and the oxygen concentration in the exhaust gases is therefore relatively high. The three-way catalysts oxidize HC and CO contained in the exhaust gases with the stored oxygen in the exhaust rich condition where the air-fuel ratio of the air-fuel mixture supplied to the engine 1 is rich with respect to the stoichiometric ratio, and the oxygen concentration in the exhaust gases is therefore low with a relatively large amount of HC and CO components.

A proportional type oxygen concentration sensor 17 (hereinafter referred to as "LAF sensor 17") is mounted on the upstream side of the catalyst unit 15. The LAF sensor 17 outputs the electrical signal substantially proportional to the oxygen concentration (air-fuel ratio) in the exhaust gases and supplies the electrical signal to the ECU 5.

A binary type oxygen concentration sensor (hereinafter referred to as "O2 sensor") 18 is mounted in the exhaust pipe 13 at a position between three-way catalysts 14a and 14b. The detection signal thereof is supplied to the ECU 5. The O2 sensor 18 has a characteristic such that its output rapidly changes in the vicinity of the stoichiometric ratio. Specifically, the O2 sensor 18 outputs a high-level signal in a rich condition with respect to the stoichiometric ratio, and outputs a low-level signal in a lean condition with respect to the stoichiometric ratio. Further, the three-way catalyst 14a is provided with a catalyst temperature sensor 19 for detecting a temperature TCAT (hereinafter referred to as "catalyst temperature") of the three-way catalyst 14a, and the detection signal is supplied to the ECU 5.

The ECU 5 includes an input circuit, a central processing unit (hereinafter referred to as "CPU"), a memory circuit, and an output circuit. The input circuit performs various functions, including shaping the waveforms of input signals from various sensors, correcting the voltage levels of the input signals to a predetermined level, and converting analog signal values into digital signal values. The memory circuit preliminarily stores various operating programs to be executed by the CPU and stores the results of computations, or the like, by the CPU. The output circuit supplies control signals to the fuel injection valves 6.

The CPU in the ECU 5 determines various engine operating conditions according to various engine operating parameter signals, as described above, and calculates a fuel injection period TOUT of each fuel injection valve 6 to be opened in synchronism with the TDC signal pulse using equation (1) according to the above-determined engine operating conditions.

$$TOUT = TIM \times KCMD \times KAF \times K1 + K2 \quad (1)$$

TIM is a basic fuel amount, specifically, a basic fuel injection period of each fuel injection valve 6, and is determined by retrieving a TIM table set according to the intake flow rate. The TIM table is set so that the air-fuel ratio of the air-fuel mixture supplied to the engine 1 becomes substantially equal to the stoichiometric ratio.

KCMD is a target air-fuel ratio coefficient set according to the O2 sensor output SVO2 when performing normal control. The target air-fuel ratio coefficient KCMD is proportional to the reciprocal of the air-fuel ratio A/F, i.e., proportional to a fuel-air ratio F/A, and takes a value of "1.0" for the stoichiometric ratio. Therefore, the target air-fuel ratio coefficient KCMD is referred to also as "target equivalent ratio". When performing a deterioration determination of the catalyst described below, the target air-fuel ratio coefficient KCMD is set so that the air-fuel ratio is controlled to be alternately rich and lean with respect to the stoichiometric ratio.

KAF is an air-fuel ratio correction coefficient calculated using a PID (proportional, integral, and differential) control method or an adaptive control method using a self-tuning regulator so that a detected equivalent ratio KACT calculated from a detected value of the LAF sensor 17 coincides with the target equivalent ratio KCMD when an execution condition of the air-fuel ratio feedback control is satisfied. When there is a deviation between a detected value of the LAF sensor 17 and a detected value of the O2 sensor 18, the detected equivalent ratio KACT is corrected with a correction amount PO2C described below to calculate a corrected equivalent ratio KACTM. That is, the air-fuel ratio correction coefficient KAF is calculated so that the corrected equivalent ratio KACTM coincides with the target equivalent ratio KCMD.

K1 and K2 are, respectively, a correction coefficient and a correction variable computed according to various engine parameter signals. The correction coefficient K1 and correction variable K2 are set to predetermined values that optimize various characteristics such as fuel consumption characteristics and engine acceleration characteristics according to engine operating conditions.

The CPU in the ECU 5 supplies a drive signal for opening each fuel injection valve 6 according to the fuel injection period TOUT obtained as described above through the output circuit to the fuel injection valve 6. Further, the CPU in the ECU 5 performs the deterioration determination of the three-way catalyst 14a as described below. For example, when the three-way catalyst 14a is determined to be deteriorated beyond an acceptable level, it is estimated that the three-way catalyst 14b is also deteriorated to the almost same degree, and a warning lamp can then be turned on.

Figure 2A:
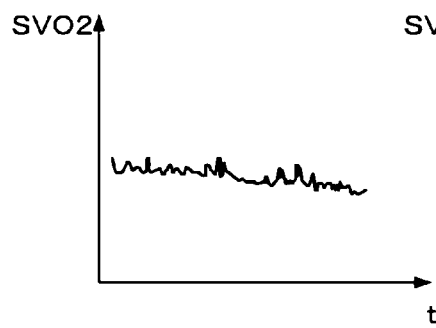
FIGS. 2A and 2B are graphical representations showing the output of the second oxygen concentration sensor in the deterioration detection method of the catalyst.
Figure 2B:
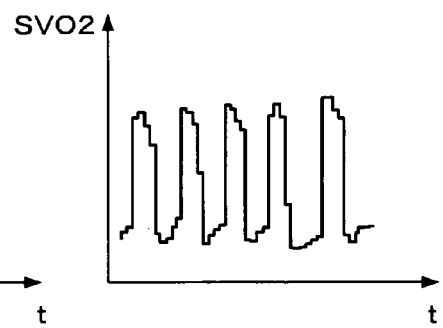

The deterioration determination of the three-way catalyst is performed based on the O2 sensor output SVO2 when changing the air-fuel ratio of the air-fuel mixture supplied to the engine 1 with a center of the stoichiometric ratio (when alternately performing lean operation and rich operation). As described above, the control in which lean operation and rich operation are alternately performed is hereinafter referred to as "perturbation control." Specifically, lean operation is performed for supplying oxygen to the three-way catalyst by an amount that can be stored in the normal three-way catalyst but cannot be stored in the deteriorated three-way catalyst. Thereafter, lean operation is switched to rich operation. Rich operation is performed so that almost all of the stored oxygen is discharged. When such perturbation control is executed, the output SVO2 of the O2 sensor 18 minimally changes as shown in FIG. 2A if the three-way catalyst is not deteriorated. However, if the three-way catalyst is deteriorated, the O2 sensor output greatly changes as shown in FIG. 2B. Therefore, in this embodiment, the deterioration determination of the three-way catalyst is performed by detecting this difference.

Figure 3:
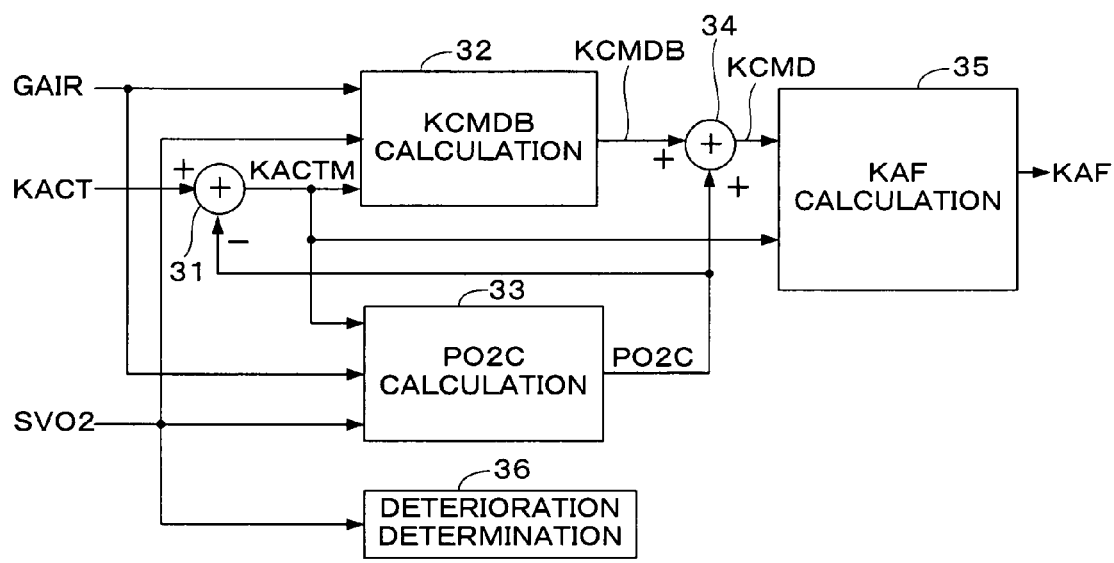
FIG. 3 is a block diagram showing a configuration of a module which performs an air-fuel ratio control and a deterioration detection of the catalyst.

FIG. 3 is a block diagram showing a configuration of a module which performs the air-fuel ratio control and the deterioration determination of the three-way catalyst. The function of each block which constitutes this module is actually realized by the processes executed by the CPU in the ECU 5.

The module shown in FIG. 3 includes a subtracting block 31, a KCMDB calculation block 32 for calculating a basic value KCMDB of the target equivalent ratio, a PO2C calculation block 33 for calculating the correction amount PO2C with which the detected equivalent ratio KACT is corrected, an adding block 34, a KAF calculation block 35 for calculating the air-fuel ratio correction coefficient KAF, and a deterioration determination block 36 for performing the deterioration determination of the three-way catalyst 14a.

The subtracting block 31 subtracts the correction amount PO2C from the detected equivalent ratio KACT to calculate the corrected equivalent ratio KACTM. The KCMDB calculation block 32 calculates the basic value KCMDB according to the intake air flow rate GAIR, the corrected equivalent ratio KACTM, and the O2 sensor output SVO2. Specifically, the KCMDB calculation block 32 sets the basic value KCMDB for performing the perturbation control in which rich operation and lean operation are alternately performed.

The PO2C calculation block 33 calculates the correction amount PO2C of the detected equivalent ratio KACT according to the intake air flow rate GAIR, the corrected equivalent ratio KACTM, and the O2 sensor output SVO2. The correction amount PO2C is a parameter for correcting a deviation of the detected equivalent ratio KACT caused by aging of the detection characteristic of the LAF sensor 17, or a change in the operating condition of the engine 1.

The adding block 34 adds the correction amount PO2C to the basic value KCMDB to calculate the target equivalent ratio KCMD. The KAF calculation block 35 calculates the air-fuel ratio correction coefficient KAF so that the corrected equivalent ratio KACTM coincides with the target equivalent ratio KCMD.

The deterioration determination block 36 determines the deterioration of the three-way catalyst 14*a* according to the O2 sensor output SVO2 when executing perturbation control.

Figure 4:
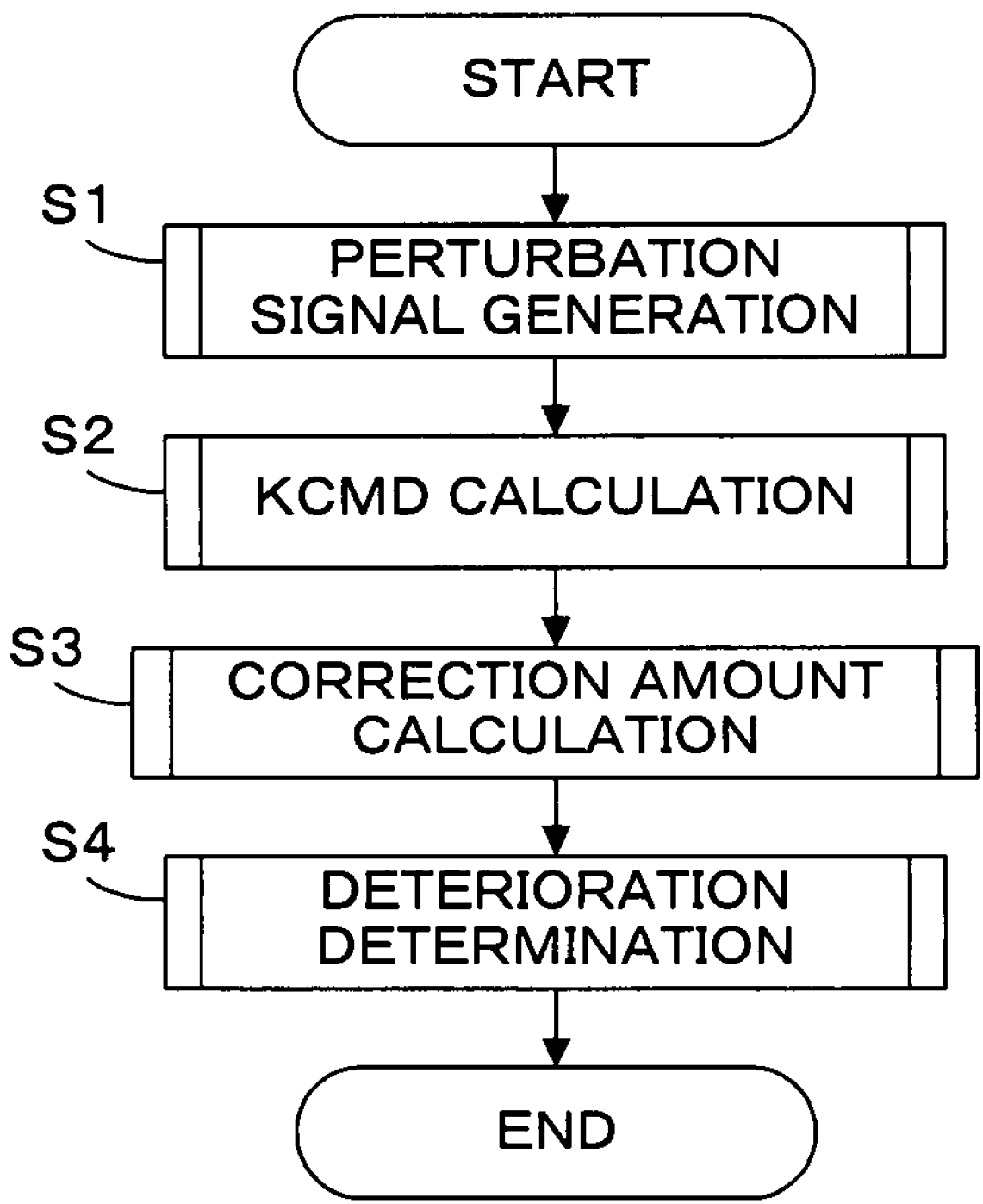
FIG. 4 is a flowchart of a process for implementing functions of the blocks which constitute the module shown in FIG. 3.

FIG. 4 is a flowchart of a main routine of an operation process for realizing the functions of the subtracting block 31, the KCMDB calculation block 32, the PO2C calculation block 33, the adding block 34, and the deterioration determination block 36 as described above. The process is executed by the CPU in the ECU 5 at predetermined time intervals (for example, 10 milliseconds).

Figure 5:
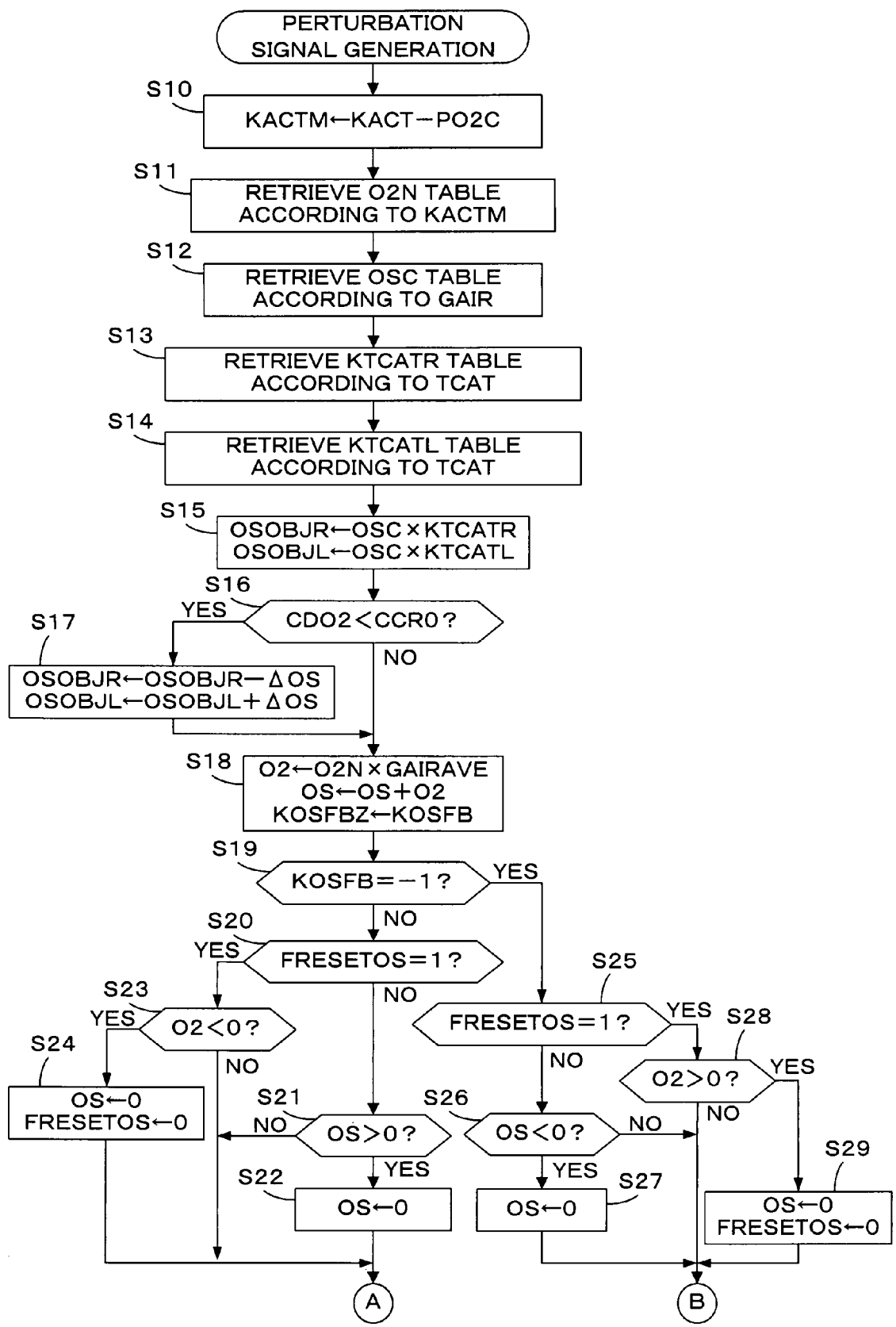
FIGS. 5 and 6 are flowcharts of the perturbation signal generation process executed in the process of FIG. 4.
Figure 8:
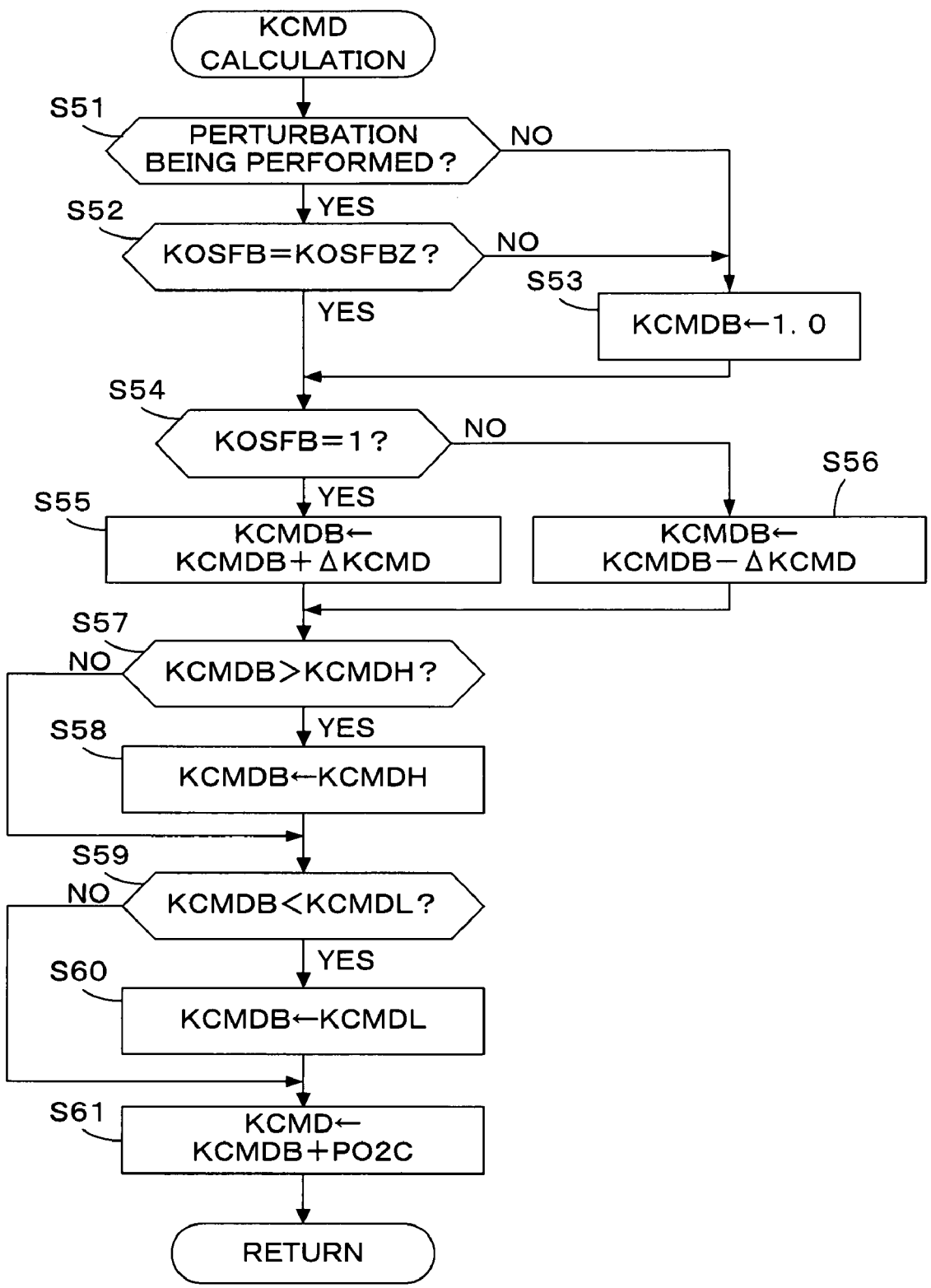
FIG. 8 is a flowchart of the KCMD calculation process executed in the process of FIG. 4.

In step S1, the process shown in FIGS. 4 and 5 is executed and a perturbation signal for changing the air-fuel ratio is generated. Specifically, the generation of the perturbation signal corresponds to setting an air-fuel ratio switching parameter KOSFB to "1" or "−1". In step S2, the process shown in FIG. 8 is executed to set the target air-fuel ratio coefficient KCMD according to the air-fuel ratio switching parameter KOSFB. When performing normal control, the target air-fuel ratio coefficient KCMD is set according to the output SVO2 of the O2 sensor 18. When performing the deterioration determination of the three-way catalyst, the target air-fuel ratio coefficient KCMD is set according to the air-fuel ratio switching parameter KOSFB that is set in step S1, thereby performing the perturbation control of the air-fuel ratio.

Figure 10:
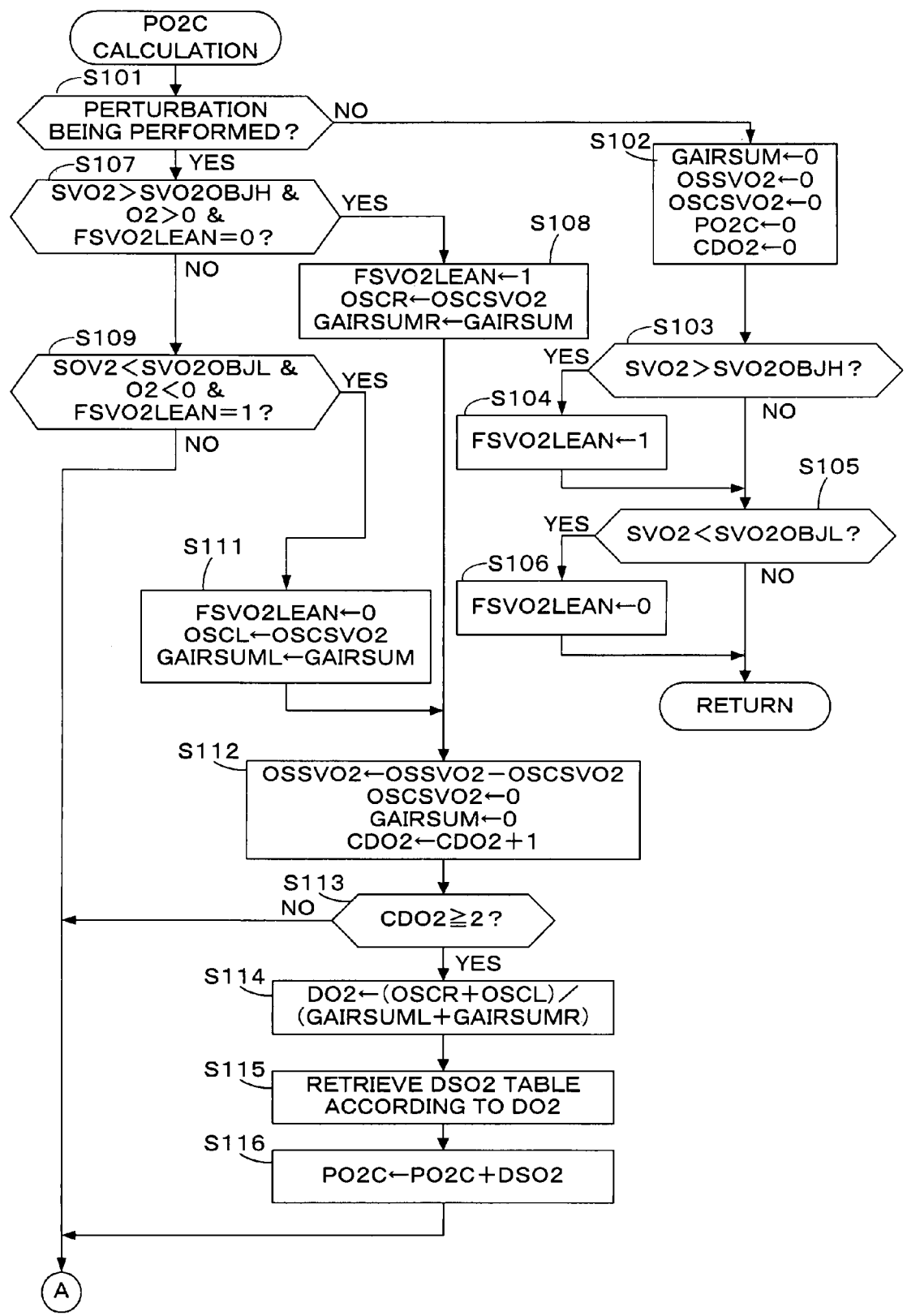
FIGS. 10 and 11 are flowcharts of the correction amount (PO2C) calculation process executed in the process of FIG. 4.
Figure 11:
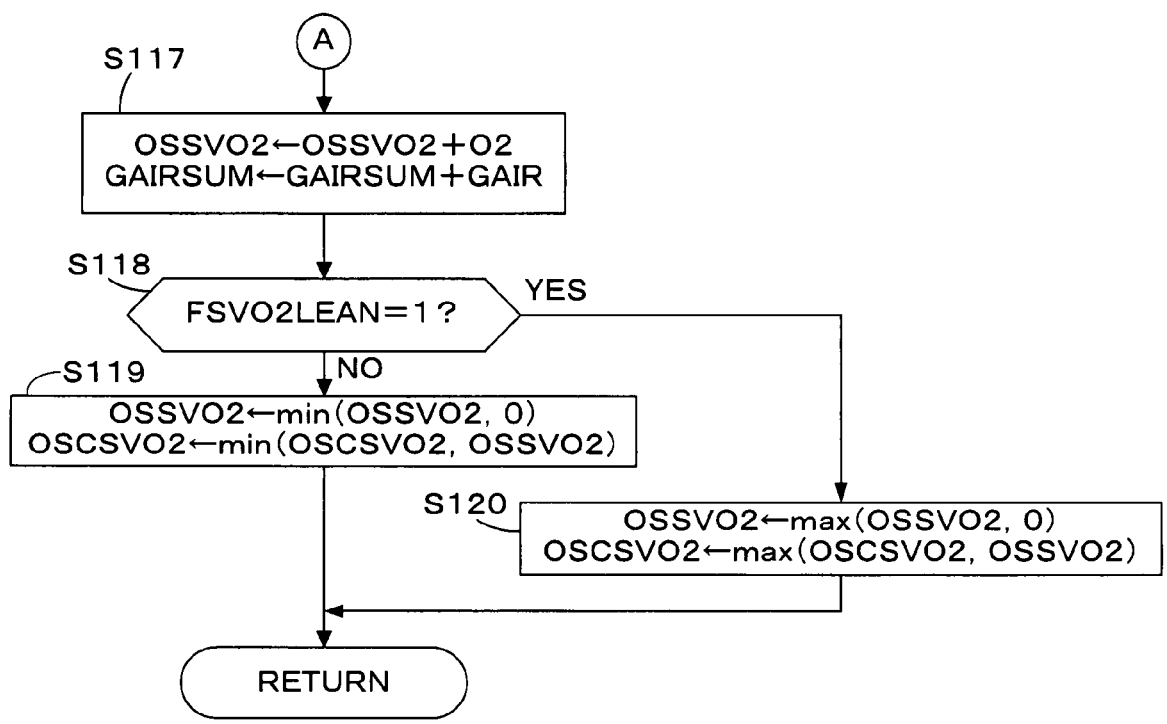

In step S3, the process shown in FIGS. 10 and 11 is executed, and the correction amount PO2C of the detected equivalent ratio KACT is calculated.

Figure 14:
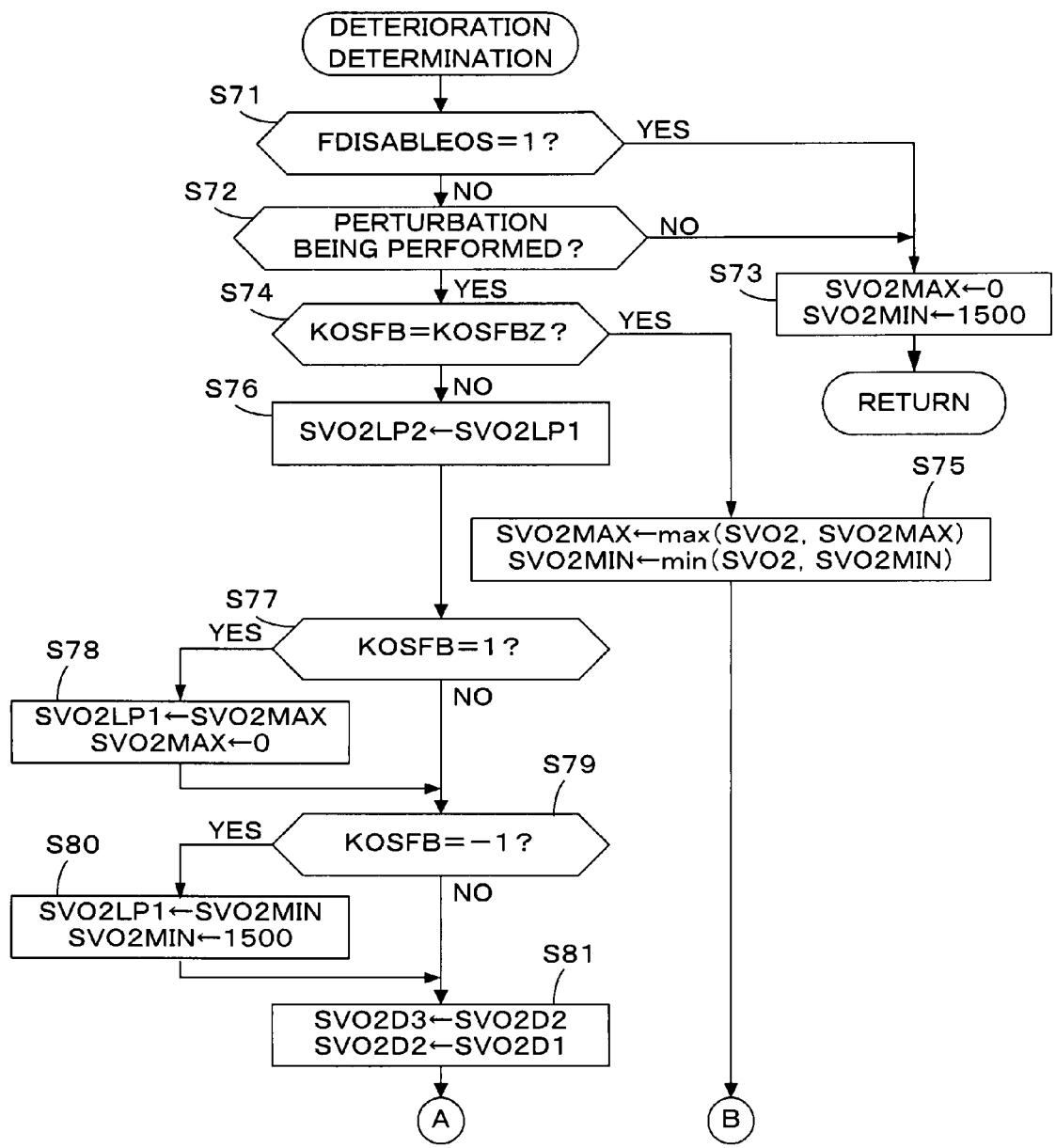

In step S4, the process shown in FIGS. 14 and 15 is executed, and a determination parameter RESULT indicative of the deterioration degree of the three-way catalyst is calculated based on the O2 sensor output SVO2 during the perturbation control. If the determination parameter RESULT exceeds a determination threshold value RSTTH, the three-way catalyst is determined to be deteriorated beyond an acceptable level.

Figure 6:
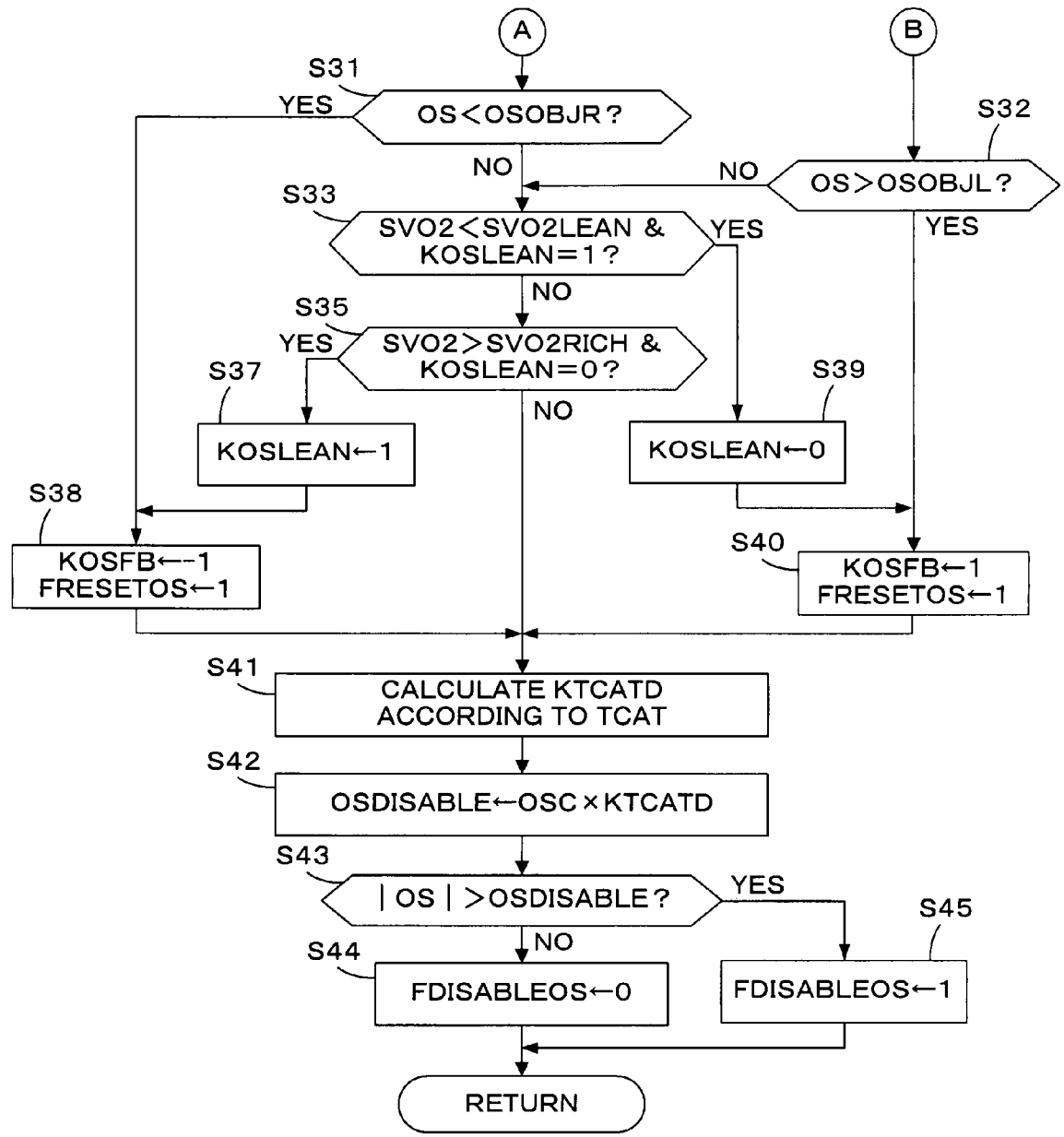

FIGS. 5 and 6 show a flowchart of the perturbation signal generation process executed in step S1 of FIG. 4.

Figure 7A:
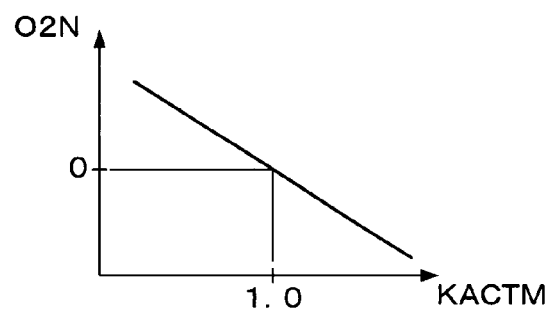
FIGS. 7A-7E are graphical representations of the tables referred to in the process of FIG. 5 or FIG. 6.

In step S10, the corrected equivalent ratio KACTM is calculated by subtracting the correction amount PO2C from the detected equivalent ratio KACT. In step S11, an O2N table shown in FIG. 7A is retrieved according to the corrected equivalent ratio KACTM to calculate an oxygen concentration parameter O2N which is proportional to the oxygen concentration in the exhaust gases. The O2N table is set as follows: the oxygen concentration parameter O2N is set to "0" when the oxygen concentration detected by the LAF sensor 17 is equal to an oxygen concentration O2ST (KACT=1.0) corresponding to the stoichiometric ratio; the oxygen concentration parameter O2N is set to a positive value when the oxygen concentration detected by the LAF sensor 17 is higher than the oxygen concentration O2ST (when the air-fuel ratio is lean with respect to the stoichiometric ratio); and the oxygen concentration parameter O2N is set to a negative value when the oxygen concentration detected by LAF sensor 17 is lower than the oxygen concentration O2ST (when the air-fuel ratio is rich with respect to the stoichiometric ratio).

Figure 7B:
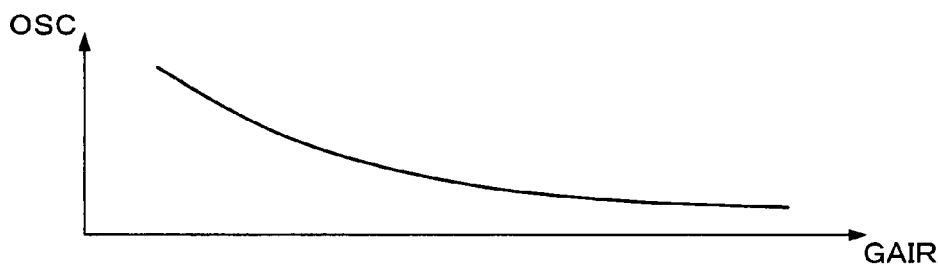

In step S12, an OSC table graphically shown in FIG. 7B is retrieved according to the intake air flow rate GAIR to calculate a reference oxygen amount OSC[g] which is a reference of a deteriorated catalyst. The OSC table is set so that the reference oxygen amount OSC decreases as the intake air flow rate GAIR increases. The time period which is necessary for the exhaust gases to pass through the three-way catalyst becomes shorter as the intake air flow rate GAIR increases. On the other hand, if a catalyst temperature and a difference (b-a) between the oxygen concentration (a) in the exhaust gases flowing into the three-way catalyst and the oxygen concentration (b) in the exhaust gases that exist in the three-way catalyst are constant, a reaction rate (accumulation rate of oxygen) in the three-way catalyst is substantially constant. Therefore, the amount of oxygen which can be stored in the three-way catalyst decreases as the intake air flow rate GAIR increases. Consequently, the OSC table is set as shown in FIG. 7B.

Figure 7C:
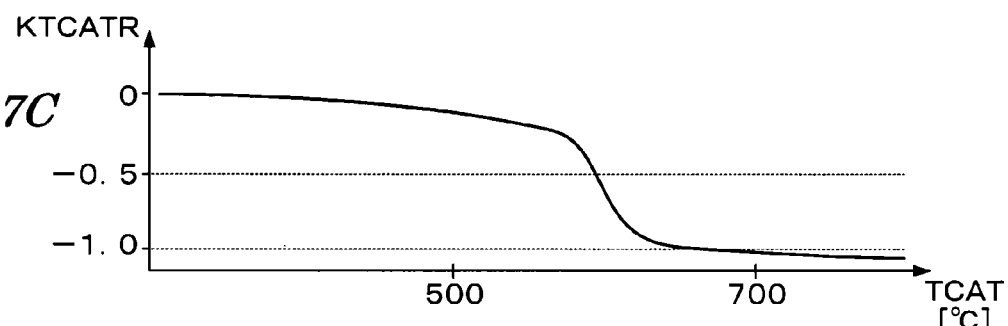

In step S13, a KTCATR table graphically shown in FIG. 7C is retrieved according to the catalyst temperature TCAT to calculate a first temperature correction coefficient KTCATR. The KTCATR table is set so that the first temperature correction coefficient KTCATR takes a negative value and decreases (the absolute value may increase) as the catalyst temperature TCAT rises.

Figure 7D:
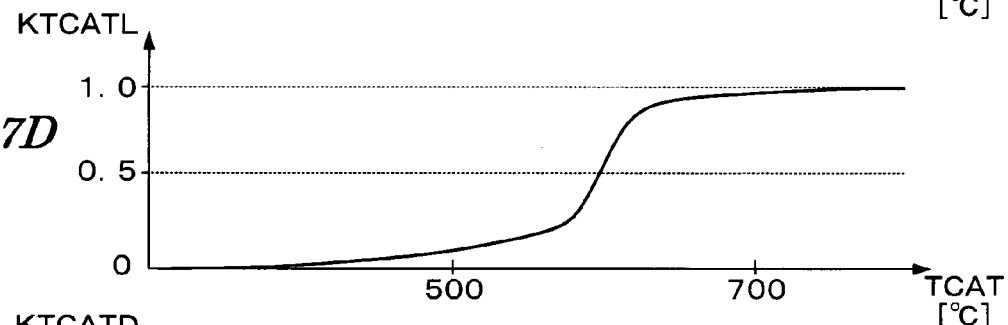

In step S14, a KTCATL table graphically shown in FIG. 7D is retrieved according to the catalyst temperature TCAT to calculate a second temperature correction coefficient KTCATL. The KTCATL table is set so that the second temperature correction coefficient KTCATL takes a positive value and increases as the catalyst temperature TCAT rises.

In step S15, the reference oxygen amount OSC and the temperature correction coefficients KTCATR and KTCATL are applied to equations (2) and (3) to calculate a rich limit value OSOBJR and a lean limit value OSOBJL.

$$OSOBJR = OSC \times KTCATR \quad (2)$$

$$OSOBJL = OSC \times KTCATL \quad (3)$$

The rich limit value OSOBJR and the lean limit value OSOBJL, which are calculated as described above, are target values of an inflowing oxygen amount OS calculated in step S18 and are used as a threshold value for determining the timing of switching the air-fuel ratio in steps S31 or S32 described below. The lean limit value OSOBJL corresponds to an amount of the inflowing oxygen that the normal three-way catalyst can store but the deteriorated three-way catalyst cannot store. The rich limit value OSOBJR is set to a negative value whose absolute value is substantially equal to the lean limit value OSOBJL. In other words, the rich limit value OSOBJR and the lean limit value OSOBJL are set so that the O2 sensor output SVO2 will minimally change when the three-way catalyst is normal, and the O2 sensor output SVO2 may greatly change when the three-way catalyst is deteriorated.

In step S16, whether a value of a counter CDO2 is less than a predetermined value CCR0 (for example, 2) is determined. The counter CDO2 is incremented in step S112 of FIG. 10 described below and counts a number of calculations of the parameter required in order to calculate the correction amount PO2C. When the O2 sensor output SVO2 has at least twice turned over (changed from a value indicative of a lean air-fuel ratio to a value indicative of a rich air-fuel ratio, or vice versa) after the perturbation control starts, it becomes possible to calculate the correction amount PO2C. Therefore, if CDO2 is less than CCR0 in step S16, the rich limit value OSOBJR is decreased and the lean limit value OSOBJL is increased by equations (4) and (5) (step S17).

$$OSOBJR = OSOBJR - \Delta OS \quad (4)$$

$$OSOBJL = OSOBJL + \Delta OS \quad (5)$$

According to steps S16 and S17, the O2 sensor output SVO2 is surely made to turn over at least CCR0 times, and the correction amount PO2C can be calculated.

In step S18, the oxygen concentration parameter O2N is applied to equation (5) to calculate the inflowing oxygen flow rate O2. The inflowing oxygen flow rate O2 is applied to equation (6) to calculate the first inflowing oxygen amount OS. Further, a preceding value KOSFBZ of the air-fuel ratio switching parameter is set to the present value KOSFB.

$$O2 = O2N \times GAIRAVE \quad (5)$$

$$OS = OS + O2 \quad (6)$$

In equation (5), GAIRAVE is a moving average value of, for example, about six data of the intake air flow rate GAIR, and OS on the right side of equation (6) is a preceding calculated value. The calculation process (not shown) of the averaging air flow rate GAIRAVE is executed in synchronism with generation of the CRK pulse.

In step S19, whether the air-fuel ratio switching parameter KOSFB is equal to "-1" is determined. If the answer to step S19 is affirmative (YES), which indicates that the engine 1 is in the lean operating condition, whether a reset flag FRESETOS is equal to "1" (step S25) is determined. The reset flag FRESETOS is set to "1" when the value of the air-fuel ratio switching parameter KOSFB is changed (refer to steps S38 and S40). Since the answer to step S25 is affirmative (YES) immediately after the air-fuel ratio switching parameter KOSFB is changed to "-1", the process proceeds to step S28, wherein whether the inflowing oxygen flow rate O2 is a positive value is determined. The answer to step S28 is negative (NO) at the beginning of lean operation, and the process immediately proceeds step S32 (FIG. 6). If lean operation is performed and the oxygen concentration in exhaust gases becomes high, the answer to step S28 becomes affirmative (YES), and the process proceeds to step S29, wherein the first inflowing oxygen amount OS is set to "0" and the reset flag FRESETOS is returned to "0". Thereafter, the process proceeds to step S32.

If the reset flag FRESETOS is returned to "0", the answer to step S25 becomes negative (NO), and the process proceeds to step S26, wherein whether the first inflowing oxygen amount OS is a negative value is determined. Since the answer to step S26 is normally negative (NO), the process immediately proceeds to step S32. If the first inflowing oxygen amount OS is a negative value, the inflowing oxygen amount OS is reset to "0" (step S27) and the process proceeds to step S32.

In step S32, whether the first inflowing oxygen amount OS is greater than the lean limit value OSOBJL is determined. Since the answer to step S32 is negative (NO) at the beginning of lean operation, the process proceeds to step S33, wherein whether the O2 sensor output SVO2 is less than a first lean predetermined value SVO2LEAN and a downstream oxygen concentration parameter KOSLEAN is equal to "1" (step S33) are determined. The first lean predetermined value SVO2LEAN corresponds to an air-fuel ratio which is slightly leaner than the stoichiometric ratio. The downstream oxygen concentration parameter KOSLEAN is set to "0" when the O2 sensor output SVO2 takes a value indicative of a lean air-fuel ratio (refer to step S39). Since the answer to step S33 is normally negative (NO), the process proceeds to step S35, wherein whether the O2 sensor output SVO2 is greater than a first rich predetermined value SVO2RICH (>SVO2LEAN) and the downstream oxygen concentration parameter KOSLEAN is equal to "0" are determined. The first rich predetermined value SVO2RICH corresponds to an air-fuel ratio which is slightly richer than the stoichiometric ratio. Since the answer to step S35 is also normally negative (NO), the process immediately proceeds to step S41.

Thereafter, if lean operation is continued, the first inflowing oxygen amount OS gradually increases. If the first inflowing oxygen amount OS exceeds the lean limit value OSOBJL in step S32, the process proceeds directly to step S40, wherein the air-fuel ratio switching parameter KOSFB is set to "1" and the reset flag FRESETOS is set to "1", thereby starting rich operation.

If the air-fuel ratio switching parameter KOSFB is changed from "-1" to "1", the process proceeds from step S19 to step S20, wherein whether the reset flag FRESETOS is equal to "1" is determined. Since the answer to step S20 is initially affirmative (YES), the process proceeds to step S23, wherein whether the inflowing oxygen flow rate O2 is a negative value is determined. At the beginning of rich operation, the answer to step S23 is negative (NO), and the process immediately proceeds to step S31 (FIG. 6). When the oxygen concentration in exhaust gases decreases after starting rich operation, the answer to step S23 becomes affirmative (YES), and the process proceeds to step S24, wherein the first inflowing oxygen amount OS is set to "0" and the reset flag FRESETOS is returned to "0". Then the process proceeds to step S31. The first inflowing oxygen amount OS thereafter takes a negative value during rich operation. This means that reducing components (HC, CO) are supplied to the three-way catalyst 14a, and the accumulated oxygen therein is used for oxidizing the reducing components and decreases (flows out from the catalyst 14a).

If the reset flag FRESETOS is returned to "0", the answer to step S20 becomes negative (NO), and the process proceeds to step S21, wherein whether the first inflowing oxygen amount OS is a positive value is determined. Since the answer to step S20 is normally negative (NO), the process immediately proceeds to step S31. If the first inflowing oxygen amount OS is a positive value, the inflowing oxygen amount OS is reset to "0" (step S22), and the process proceeds to step S31.

In step S31, whether the first inflowing oxygen amount OS is less than the rich limit value OSOBJR is determined. Since the answer to step S31 is negative (NO) at the beginning of rich operation, the process proceeds to step S33 described above. Normally, both of the answers to steps S33 and S35 are negative (NO).

Thereafter, if rich operation is continued, the first inflowing oxygen amount OS gradually decreases (the absolute value of the negative value increases). If the first inflowing oxygen amount OS becomes less than the rich limit value OSOBJR in step S31, the process proceeds to step S38, wherein the air-fuel ratio switching parameter KOSFB is set to "-1" and the reset flag FRESETOS is set to "1", thereby starting lean operation.

If the degree of deterioration of the three-way catalyst 14a increases, the answer to step S33 may become affirmative (YES) during lean operation. Then, the process proceeds from step S33 to step S39, wherein the downstream oxygen concentration parameter KOSLEAN is set to "0". Thereafter, the process proceeds to step S40 to start rich operation. That is, in this case, the switching to rich operation is performed before the first inflowing oxygen amount OS exceeds the lean limit value OSOBJL. Further, the answer to step S35 may become affirmative (YES) during rich operation. Then, the process proceeds from step S35 to step S37, wherein the downstream oxygen concentration parameter KOSLEAN is set to "1". Thereafter, the process proceeds to step S38 to start lean operation. That is, in this case, the switching to lean operation is performed before the first inflowing oxygen amount OS becomes lower than the rich limit value OSOBJR.

The determination using the downstream oxygen concentration parameter KOSLEAN in addition to the O2 sensor output SVO2 is performed for preventing the control from hunting with the hysteresis.

According to steps S16, S17, S33, S35, S37, and S39 described above, if the O2 sensor output SVO2 is reversed, the correction amount PO2C can surely be calculated. The exhaust characteristics are prevented from deteriorating even if the three-way catalyst 14a is deteriorated and the O2 sensor output SVO2 changes before the first inflowing oxygen amount OS exceeds the limit values OSOBJL or OSOBJR.

Figure 7E:
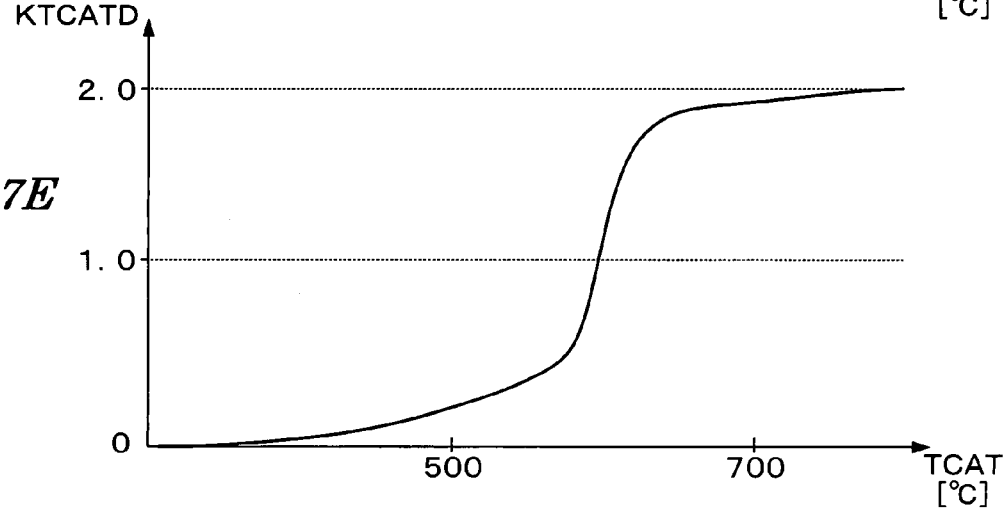

In step S41, a KTCATD table graphically shown in FIG. 7E is retrieved according to the catalyst temperature TCAT to calculate a third temperature correction coefficient KTCATD. The KTCATD table is set so that the third temperature correction coefficient KTCATD increases as the catalyst temperature TCAT rises, like the KTCATL table. Further, at the same catalyst temperature TCAT, the third temperature correction coefficient KTCATD is set to a value greater than the second temperature correction coefficient KTCATL.

In step S42, the third temperature correction coefficient KTCATD and the reference oxygen amount OSC calculated in step S12 are applied to equation (7) to calculate an inhibition determination threshold value OSDISABLE.

$$OSDISABLE = OSC \times KTCATD \qquad (7)$$

In step S43, whether the absolute value of the first inflowing oxygen amount OS is greater than the inhibition determination threshold value OSDISABLE is determined. If the answer to step S43 is affirmative (YES), an inhibition flag FDISABLEOS is set to "1" (step S45). When |OS| is equal to or less than OSDISABLE, the inhibition flag FDISABLEOS is set to "0" (step S44). If the inhibition flag FDISABLEOS is set to "1", the deterioration determination of the catalyst is stopped (refer to FIG. 14, step S71).

For example, when the throttle valve opening rapidly changes and the air-fuel ratio control cannot quickly follow the change in the intake air amount, the absolute value of the first inflowing oxygen amount OS may become unusually large. In such a case, the deterioration determination cannot be accurately performed. Therefore, the determination accuracy is prevented from being lowered by inhibiting the deterioration determination.

FIG. 8 is a flowchart of the KCMD calculation process executed in step S2 of FIG. 4.

In step S51, whether the perturbation of the air-fuel ratio is performed is determined. If the answer to step S51 is affirmative (YES), whether the air-fuel ratio switching parameter KOSFB set in the process of FIGS. 5 and 6 is equal to the preceding value KOSFBZ (step S52) is determined.

If the answer to step S51 or S52 is negative (NO), i.e., the perturbation is not executed, or if the value of the air-fuel ratio switching parameter KOSFB has changed, the basic value KCMDB of the target air-fuel ratio coefficient is set to "1.0" (step S53), and the process proceeds to step S54. If KOSFB is equal to KOSFBZ, the process immediately proceeds to step S54.

In step S54, whether the air-fuel ratio switching parameter KOSFB is equal to "1" is determined. If the answer to step S54 is affirmative (YES), the basic value KCMDB is updated by equation (8) (step S55).

$$KCMDB = KCMDB + \Delta KCMD \qquad (8)$$

where ΔKCMD is a predetermined updating value, which is, for example, set to "0.0002".

If the air-fuel ratio switching parameter KOSFB is equal to "1", the basic value KCMDB gradually increases from "1.0" by repeatedly executing step S55. That is, the air-fuel ratio gradually changes in the rich direction.

If KOSFB is equal to "−1" in step S54, the basic value KCMDB is updated by equation (9) (step S56).

$$KCMDB = KCMDB - \Delta KCMD \qquad (9)$$

Therefore, if the air-fuel ratio switching parameter KOSFB is equal to "−1", the basic value KCMDB gradually decreases from "1.0" by repeatedly executing step S56. That is, the air-fuel ratio gradually changes in the lean direction.

In steps S57 to S60, a limit process of the calculated basic value KCMDB is performed. That is, if the basic value KCMDB is greater than an upper limit value KCMDH (for example, "1.03"), the basic value KCMDB is set to the upper limit value KCMDH (steps S57, S58). If the basic value KCMDB is less than a lower limit value KCMDL (for example, "0.97"), the basic value KCMDB is set to the lower limit value KCMDL (steps S59, S60).

In step S61, the target air-fuel ratio coefficient (target equivalent ratio) KCMD is calculated by adding the correction amount PO2C to the basic value KCMDB.

Figure 9:
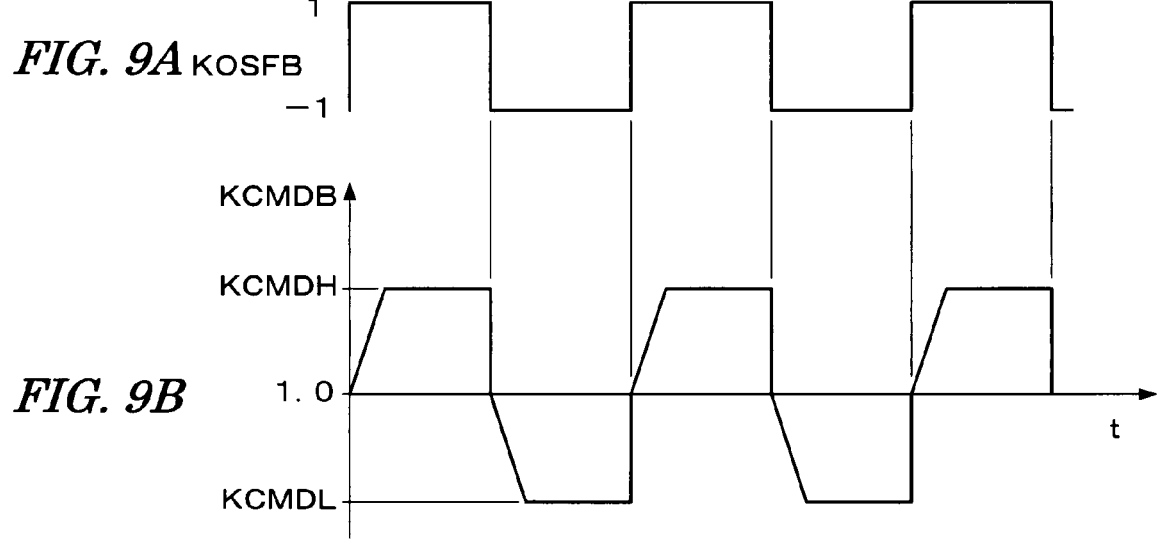
FIGS. 9A and 9B are graphical representations of the time charts for explaining the process of FIG. 8.

According to the process of FIG. 8, the basic value KCMDB changes, as graphically shown in FIG. 9B, according to the value of the air-fuel ratio switching parameter KOSFB (FIG. 9A).

FIGS. 10 and 11 show a flowchart of a PO2C calculation process executed in step S3 of FIG. 4.

In step S101, whether the perturbation of the air-fuel ratio is being executed is determined. If the answer to step S101 is negative (NO), the process proceeds to step S102, wherein an initialization of the parameters used in this process is performed. That is, an intake air amount GAIRSUM, a second inflowing oxygen amount OSSVO2, a peak inflowing oxygen amount OSCSVO2, the correction amount PO2C, and the value of the counter CDO2 are all set to "0". The intake air amount GAIRSUM is an accumulated value of the intake air flow rate GAIR calculated in step S117, and the second inflowing oxygen amount OSSVO2 is an amount of oxygen flowing into the three-way catalyst 14a. The second inflowing oxygen amount OSSVO2 is also calculated in step S117.

In step S103, whether the O2 sensor output SVO2 is greater than a second rich predetermined value SVO2OBJH (which is set to a value slightly less than the first rich predetermined value SVO2RICH) is determined. The second rich predetermined value SVO2OBJH corresponds to an air-fuel ratio which is slightly richer than the stoichiometric ratio. If the answer to step S103 is affirmative (YES), a downstream concentration flag FSVO2LEAN is set to "1" (step S104) and the process proceeds to step S105. If SVO2 is equal to or less than SVO2OBJH in step S103, the process immediately proceeds to step S105.

In step S105, whether the O2 sensor output SVO2 is less than a second lean predetermined value SVO2OBJL (which is set to a value slightly greater than the first lean predetermined value SVO2LEAN) is determined. The second lean predetermined value SVO2OBJL corresponds to an air-fuel ratio which is slightly leaner than the stoichiometric ratio. If the answer to step S105 is affirmative (YES), the downstream concentration flag FSVO2LEAN is set to "0" (step S106), and thereafter, the process ends. If SVO2 is equal to or greater than SVO2OBJL in step S105, the process immediately ends.

If the answer to step S101 is affirmative (YES), i.e., if the perturbation is being performed, whether the O2 sensor output SVO2 is greater than the second rich predetermined value SVO2OBJH, the inflowing oxygen flow rate O2 is a positive value, and the downstream concentration flag FSVO2LEAN is equal to "0" (step S107) are determined. That is, in step S107, whether the O2 sensor output SVO2 has changed from a value indicative of a lean air-fuel ratio to a value indicative of a rich air-fuel ratio, and the inflowing oxygen flow rate O2 has changed from a negative to a positive value (the corrected equivalent ratio KACTM has become less than "1.0") are determined. During the perturbation control, the inflowing oxygen flow rate O2 changes to a positive value after the O2 sensor output SVO2 changes from a value indicative of the lean air-fuel ratio to a value indicative of the rich air-fuel ratio and lean operation is started.

If the answer to step S107 is negative (NO), whether the O2 sensor output SVO2 is less than the second lean region predetermined value SVO2OBJL, the inflowing oxygen flow rate O2 is a negative value, and the downstream concentration flag FSVO2LEAN is equal to "1" (step S109) are determined. That is, in step S109, whether the O2 sensor output SVO2 has changed from a value indicative of the rich air-fuel ratio to a value indicative of the lean air-fuel ratio, and the inflowing oxygen flow rate O2 has changed from a positive value to a negative value (the corrected equivalent ratio KACTM has exceeded "1.0") are determined. During the perturbation control, the inflowing oxygen flow rate O2 changes to a negative value after the O2 sensor output SVO2 changes from a value indicative of the rich air-fuel ratio to a value indicative of the lean air-fuel ratio and rich operation is started.

If the answer to step S109 is negative (NO), the process proceeds to step S117, wherein the second inflowing oxygen amount OSSVO2 and the intake air amount GAIRSUM are calculated by equations (10) and (11).

$$OSSVO2 = OSSVO2 + O2 \quad (10)$$

$$GAIRSUM = GAIRSUM + GAIR \quad (11)$$

In step S118, whether the downstream concentration flag FSVO2LEAN is equal to "1" is determined. If the answer to step S118 is affirmative (YES), i.e., the O2 sensor output SVO2 indicates the rich air-fuel ratio and the inflowing oxygen flow rate O2 takes a positive value, the second inflowing oxygen amount OSSVO2 and the peak inflowing oxygen amount OSCSVO2 are calculated by equations (12) and (13) (step S120).

$$OSSVO2 = \max(OSSVO2, 0) \quad (12)$$

$$OSCSVO2 = \max(OSCSVO2, OSSVO2) \quad (13)$$

When the second inflowing oxygen amount OSSVO2 takes a negative value, the second inflowing oxygen amount OSSVO2 is reset to "0" by equation (12). Further, the peak inflowing oxygen amount OSCSVO2 is calculated as a maximum value of the second inflowing oxygen amount OSSVO2 by equation (13).

If FSVO2LEAN is equal to "0" in step S118, i.e., the O2 sensor output SVO2 indicates the lean air-fuel ratio and the inflowing oxygen flow rate O2 takes a negative value, the second inflowing oxygen amount OSSVO2 and the peak inflowing oxygen amount OSCSVO2 are calculated by equations (14) and (15) (step S19).

$$OSSVO2 = \min(OSSVO2, 0) \quad (14)$$

$$OSCSVO2 = \min(OSCSVO2, OSSVO2) \quad (15)$$

When the second inflowing oxygen amount OSSVO2 takes a positive value, the second inflowing oxygen amount OSSVO2 is reset to "0" by equation (14). Further, the peak inflowing oxygen amount OSCSVO2 is calculated as a minimum value of the second inflowing oxygen amount OSSVO2 by equation (15).

If the answer to step S107 is affirmative (YES), the process proceeds to step S108, wherein the downstream concentration flag FSVO2LEAN is set to "1", a rich inflowing oxygen amount OSCR is set to the present value of the peak inflowing oxygen amount OSCSVO2, and a rich intake air amount GAIRSUMR is set to the present value of the intake air amount GAIRSUM.

In step S112, the second inflowing oxygen amount OSSVO2 is reset by equation (16), both the peak inflowing oxygen amount OSCSVO2 and the intake air amount GAIRSUM are reset to "0", and the counter CDO2 is incremented by "1". By equation (16), the second inflowing oxygen amount OSSVO2 is normally reset to "0". However, the second inflowing oxygen amount OSSVO2 may not be set to "0" when the response delay of the O2 sensor 18 becomes large. This point will be explained below.

$$OSSVO2 = OSSVO2 - OSCSVO2 \quad (16)$$

In step S113, it is determined whether the value of the counter CDO2 is equal to or greater than "2". Since the answer to step S113 is initially negative (NO), the process immediately proceeds to step S117.

If lean operation is thereafter performed and the answer to step S109 becomes affirmative (YES), the process proceeds to step S111, wherein the downstream concentration flag FSVO2LEAN is set to "0", a lean inflowing oxygen amount OSCL is set to the present value of the peak inflowing oxygen amount OSCSVO2, and a lean intake air amount GAIRSUML is set to the present value of the intake air amount GAIRSUM. Thereafter, the process proceeds to step S113 through step S112. At this time, the answer to step S113 becomes affirmative (YES), and the process proceeds to step S114, wherein the rich inflowing oxygen amount OSCR, the lean inflowing oxygen amount OSCL, the rich intake air amount GAIRSUMR, and the lean intake air amount GAIRSUML are applied to equation (17) to calculate an oxygen concentration deviation amount DO2. The oxygen concentration deviation amount DO2 indicates an amount of deviation between the oxygen concentration O2SVO2 detected by the O2 sensor output SVO2 and the oxygen concentration O2LAF detected by the LAF sensor 17.

$$DO2 = (OSCR + OSCL)/(GAIRSUMR + GAIRSUML) \quad (17)$$

When the oxygen concentration O2LAF coincides with the oxygen concentration O2SVO2, a sum of the rich inflowing oxygen amount OSCR and the lean inflowing oxygen amount OSCL becomes "0". Therefore, the oxygen concentration deviation amount DO2 becomes "0". Further, when the oxygen concentration O2LAF is lower than the oxygen concentration O2SVO2, the oxygen concentration deviation amount DO2 takes a negative value. Likewise, when the oxygen concentration O2LAF is higher than the oxygen concentration O2SVO2, the oxygen concentration deviation amount DO2 takes a positive value.

Figure 12:
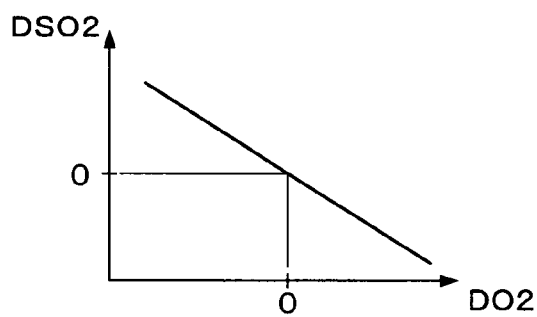
FIG. 12 is a graphical representation of a table referred to in the process of FIG. 10.

In step S115, a DSO2 table graphically shown in FIG. 12 is retrieved according to the oxygen concentration deviation amount DO2 to calculate an equivalent ratio converted value DSO2 of the oxygen concentration deviation amount DO2. In step S116, the equivalent ratio converted value DSO2 is accumulated by equation (18) to calculate the correction amount PO2C. Thereafter, the process proceeds to step S117.

$$PO2C=PO2C+DSO2 \tag{18}$$

By the conversion in step S115, the plus/minus sign of the equivalent ratio converted value DSO2 becomes contrary to the plus/minus sign of the oxygen concentration deviation amount DO2. The correction amount PO2C takes a positive value when the detected equivalent ratio KACT deviates in the rich direction and takes a negative value when the detected equivalent ratio KACT deviates in the lean direction.

Figure 13:
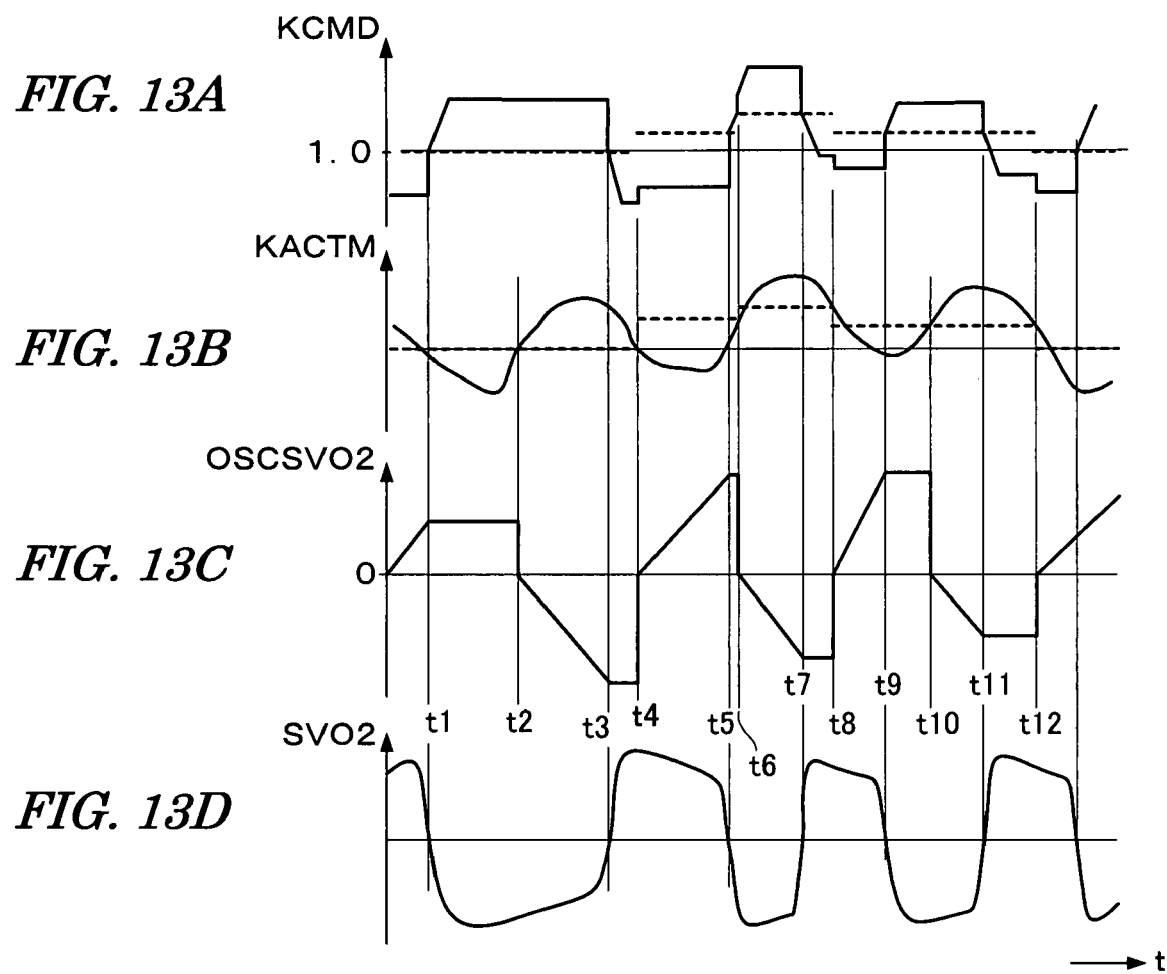
FIGS. 13A-13D are graphical representations of the time charts for explaining the process of FIG. 10 and FIG. 11.

FIGS. 13A-13D graphically show time charts for illustrating the process of FIGS. 10 and 11. Before time t4, the absolute values of the limit values OSOBJL and OSOBJR of the perturbation control are changed to greater values by steps S16 and S17 of FIG. 5, and the continuation time periods of rich operation and lean operation become long. Consequently, the O2 sensor output SVO2 turns over (FIG. 13D, times t1 and t3). At time t4, the correction amount PO2C is first calculated and the center value of the detected equivalent ratio KACT is corrected in the decreasing direction by the correction amount PO2C (FIG. 13B). In FIG. 13B, the correction of the detected equivalent ratio KACT in the decreasing direction is equivalently shown by making the "1.0" level of the equivalent ratio (shown by the dashed line in FIG. 13B) increase by the correction amount PO2C. Further, at time t4, the target air-fuel ratio coefficient KCMD increases by the correction amount PO2C (FIG. 13A). Thereafter, at times t6, t8, t10, t12, ..., the oxygen concentration deviation amount DO2 is calculated, and the correction amount PO2C is updated.

The second inflowing oxygen amount OSSVO2 gradually decreases, as shown in FIG. 13C, when the corrected equivalent ratio KACTM takes a value greater than "1.0". When the O2 sensor output SVO2 changes to a value indicative of the rich air-fuel ratio, lean operation is started (t3, t7, t11). Thereafter, the second inflowing oxygen amount OSSVO2 is detected as the rich inflowing oxygen amount OSCR at the time the corrected equivalent ratio KACTM reaches "1.0" (t4, t8, t12). Further, the second inflowing oxygen amount OSSVO2 gradually increases when the corrected equivalent ratio KACTM takes a value less than "1.0". When the O2 sensor output SVO2 changes to a value indicative of the lean air-fuel ratio, rich operation is started (t1, t5, t9). Thereafter, the second inflowing oxygen amount OSSVO2 is detected as the lean inflowing oxygen amount OSCL at the time the corrected equivalent ratio KACTM reaches "1.0" (t2, t6, t10).

It is to be noted that FIGS. 13A-13D show an example in which the three-way catalyst 14a has deteriorated and the turn-over of the O2 sensor output SVO2 continually occurs after time t3.

According to the process of FIGS. 10 and 11, the rich inflowing oxygen amount OSCR and the lean inflowing oxygen amount OSCL are calculated. The rich inflowing oxygen amount OSCR indicates an amount of oxygen flowing out from the three-way catalyst 14a during the time period from the time when the detected equivalent ratio KACT (or the corrected equivalent ratio KACTM) changes to a value indicative of the rich air-fuel ratio (t2, t6, t10) to the time when the O2 sensor output SVO2 changes to a value indicative of the rich air-fuel ratio (t3, t7, t11). The lean inflowing oxygen amount OSCL indicates an amount of oxygen flowing into the three-way catalyst 14a during the time period from the time when the detected equivalent ratio KACT (or the corrected equivalent ratio KACTM) changes to a value indicative of the lean air-fuel ratio (t4, t8) to the time when the O2 sensor output SVO2 changes to a value indicative of the lean air-fuel ratio (t5, t9). Further, the oxygen concentration deviation amount DO2 is calculated using the rich inflowing oxygen amount OSCR, the lean inflowing oxygen amount OSCL, and the corresponding intake air amounts GAIRSUMR and GAIRSUML. The correction amount PO2C is calculated from the oxygen concentration deviation amount DO2. Since the correction amount PO2C is obtained when the O2 sensor output SVO2 turns over at least twice, a deviation of the detected value, which occurs in a short time period such as a deviation caused by a change in the engine operating condition, can be corrected quickly to obtain an accurate value of the corrected equivalent ratio KACTM. Consequently, accurate air-fuel ratio switching control can be performed to appropriately control the oxygen concentration in exhaust gases flowing into the three-way catalyst 14a, thereby maintaining good exhaust characteristics.

FIGS. 14 and 15 show a flowchart of the deterioration determination process executed in step S4 of FIG. 4.

In step S71, whether the inhibition flag FDISABLEOS is equal to "1" is determined. If the answer to step S71 is negative (NO), whether the perturbation of the air-fuel ratio is being performed (step S72) is determined. If the answer to step S71 is affirmative (YES) or the answer to step S72 is negative (NO), a maximum value SVO2MAX of the O2 sensor output SVO2 is set to "0", a minimum value SVO2MIN of the O2 sensor output SVO2 is set to "1500" (step S73), and the process immediately ends.

If the answer to step S72 is affirmative (YES), i.e., when the perturbation of the air-fuel ratio is being performed, whether the air-fuel ratio switching parameter KOSFB is equal to the preceding value KOSFBZ (step S74) is determined. If KOSFB is equal to KOSFBZ, the maximum value SVO2MAX and the minimum value SVO2MIN are updated by equations (19) and (20). The operation on the right side of equation (19) is for selecting a greater one of the preceding maximum value SVO2MAX and the present O2 sensor output SVO2. The operation on the right side of equation (20) is for selecting a smaller one of the preceding minimum value SVO2MIN and the present O2 sensor output SVO2. After executing step S75, the process proceeds to step S89.

$$SVO2MAX=\max(SVO2MAX,SVO2) \tag{19}$$

$$SVO2MIN=\min(SVO2MIN,SVO2) \tag{20}$$

If the answer to step S74 is negative (NO) i.e., immediately after the air-fuel ratio switching parameter KOSFB has been changed, a second stored value SVO2LP2 of the maximum value SVO2MAX or the minimum value SVO2MIN is set to a first stored value SVO2LP1 (step S76). The first stored value SVO2LP1 is set to the maximum value SVO2MAX or the minimum value SVO2MIN in step S78 or S80 immediately after the preceding air-fuel ratio switching.

In step S77, whether the air-fuel ratio switching parameter KOSFB is equal to "1" is determined. If the answer to step S77 is affirmative (YES), the first stored value SVO2LP1 is set to the present maximum value SVO2MAX, and the maximum value SVO2MAX is reset to "0" (step S78). If the air-fuel ratio switching parameter KOSFB is equal to "−1", the answer to step S77 becomes negative (NO), and the process immediately proceeds to step S79.

In step S79, whether the air-fuel ratio switching parameter KOSFB is equal to "−1" is determined. If the air-fuel ratio switching parameter KOSFB is equal to "−1", the process proceeds to step S80, wherein the first stored value SVO2LP1 is set to the present minimum value SVO2MIN, and the minimum value SVO2MIN is reset to "1500" (step S78). If the air-fuel ratio switching parameter KOSFB is equal to "1", the answer to step S79 becomes negative (NO), and the process immediately proceeds to step S81.

In step S81, a third difference parameter SVO2D3 indicative of a difference between the maximum value SVO2MAX and the minimum value SVO2MIN is set to a second difference parameter SVO2D2, and the second difference parameter SVO2D2 is set to a first difference parameter SVO2D1. Thereafter, the first difference parameter SVO2D1 is updated in steps S82 to S87.

In step S82, whether the second stored value SVO2LP2 is greater than a predetermined value SVO2OBJ corresponding to the stoichiometric ratio and the first stored value SVO2LP1 is less than the predetermined value SVO2OBJ are determined. If the answer to step S82 is negative (NO), whether the second stored value SVO2LP2 is less than the predetermined value SVO2OBJ and the first stored value SVO2LP1 is greater than the predetermined value SVO2OBJ (step S84) are determined. If both of the answers to steps S82 and S84 are negative (NO), i.e., both the first and the second stored values SVO2LP1 and SVO2LP2 are less than the predetermined value SVO2OBJ, or when both the first and the second stored values SVO2LP1 and SVO2LP2 are greater than the predetermined value SVO2OBJ, the situation is that the O2 sensor output SVO2 minimally changes (stays at a substantially constant level). Accordingly, the first difference parameter SVO2D1 is set to "0" (step S87), and the process proceeds to step S88.

If the answer to step S82 or S84 is affirmative (YES), i.e., the maximum value SVO2MAX is greater than the predetermined value SVO2OBJ and the minimum value SVO2MIN is less than the predetermined value SVO2OBJ at consecutive timings of the air-fuel ratio switching, the first stored value SVO2LP1 and the second stored value SVO2LP2 are applied to equation (21), to calculate the first difference parameter SVO2D1 (step S86). Thereafter, the process proceeds to step S88.

$$SVO2D1 = |SVO2LP1 - SVO2LP2| \quad (21)$$

In step S88, a minimum difference value SVO2D is calculated as a minimum value of the first-to-third difference parameters SVO2D1, SVO2D2, and SVO2D3 by equation (22). Further, the minimum difference value SVO2D is accumulated to calculate a determination parameter RESULT by equation (23), and a counter CRESULT is incremented by "1". The determination parameter RESULT indicates the deterioration degree of the three-way catalyst 14a.

$$SVO2D = \min(SVO2D1, SVO2D2, SVO2D3) \quad (22)$$

$$RESULT = RESULT + SVO2D \quad (23)$$

Unless the difference parameter SVO2D1 takes a large value at three consecutive times or more, the minimum difference value SVO2D takes a relatively small value. Therefore, by using the minimum difference value SVO2D, which is the minimum value among the difference parameters SVO2D1, SVO2D2, and SVO2D3 obtained at three consecutive sampling timings, any influence of a temporary change in the O2 sensor output SVO2 can be eliminated. Accordingly, an accurate value of the determination parameter RESULT can be obtained.

In step S89, whether the value of the counter CRESULT is greater than a predetermined number CRST0 (for example, "6") is determined. If the answer to step S89 is negative (NO), the process immediately ends. If the value of the counter CRESULT exceeds the predetermined number CRST0 in step S89, the process proceeds to step S90, wherein whether the determination parameter RESULT is greater than the deterioration determination threshold value RSTTH is determined. If the answer to step S90 is negative (NO), the three-way catalyst 14a is determined to be normal (step S92). If the determination parameter RESULT exceeds the deterioration determination threshold value RSTTH, the three-way catalyst 14a is determined to be beyond an acceptable deterioration condition (step S91). A warning lamp can be, for example, turned on when the three-way catalyst 14a is determined to be in this condition.

The determination parameter RESULT takes a value substantially equal to zero when the O2 sensor output SVO2 changes as shown graphically in FIG. 2A, i.e., when the three-way catalyst 14a is normal. On the other hand, the determination parameter RESULT takes a large value when the O2 sensor output SVO2 changes as shown in FIG. 2B, i.e., when the three-way catalyst 14a is deteriorated. Accordingly, the deterioration degree of the three-way catalyst 14a can be accurately detected by using the determination parameter RESULT.

As described above, in this embodiment, the amount OS of oxygen flowing into the three-way catalyst 14a is calculated according to the oxygen concentration parameter O2N calculated according to the LAF sensor 17 output and the intake air flow rate GAIR detected by the intake air flow rate sensor 7. Further, the perturbation control of the air-fuel ratio is performed. In the perturbation control, the air-fuel ratio is controlled to alternately change between lean and rich with respect to the stoichiometric ratio according to a comparison result obtained by comparing the first inflowing oxygen amount OS with the rich limit value OSOBJR or the lean limit value OSOBJL. Further, the determination parameter RESULT indicative of the deterioration degree of the three-way catalyst 14a is calculated based on the O2 sensor output SVO2 during execution of perturbation control. The rich limit value OSOBJR and the lean limit value OSOBJL, which are target values of the first inflowing oxygen amount OS, are set so that the O2 sensor output SVO2 may minimally change when the three-way catalyst is normal and the O2 sensor output SVO2 may greatly change when the three-way catalyst is deteriorated. Therefore, the deterioration degree can be detected quickly when the catalyst begins to deteriorate, resulting in minimal degradation of the exhaust characteristics and without degrading the exhaust characteristics at all when the catalyst is normal.

Further, when there is some deviation between the oxygen concentration detected by the LAF sensor 17 and the oxygen concentration detected by the O2 sensor 18, the O2 sensor output SVO2 may not change as shown in FIG. 2B even if the three-way catalyst 14a is deteriorated. Accordingly, there is a possibility of an improper determination that the three-way catalyst 14a is normal. In this embodiment, the oxygen concentration deviation is corrected with the correction amount PO2C which makes it possible to accurately perform the determination irrespective of changes in the operating condition of the engine 1.

Further, the basic value KCMDB of the target air-fuel ratio coefficient is corrected with the correction amount PO2C to calculate the target air-fuel ratio coefficient KCMD. Accordingly, the air-fuel ratio in rich operation and the air-fuel ratio in lean operation are appropriately set to a value corresponding to the oxygen concentration detected by the LAF sensor 17, thereby maintaining the amount of oxygen flowing into the three-way catalyst 14a at a level which is almost equal to the amount of oxygen flowing out from the three-way catalyst 14a. Consequently, good oxygen accumulation condition of the three-way catalyst 14a can be maintained.

Next, the point that the initialization (reset) of the second inflowing oxygen amount OSSVO2 is performed by equation (16) (shown again) in step S112 of FIG. 10 is described below in detail with reference to FIGS. 16A-16D.

$$OSSVO2 = OSSVO2 - OSCSVO2 \quad (16)$$

In the example shown in FIGS. 16A-16D, the response characteristic of the O2 sensor 18 is deteriorated. Therefore, there is a time period in which the detected equivalent ratio KACT exceeds "1.0" before time t21 at which the O2 sensor output SVO2 changes to a value indicative of the lean air-fuel ratio. Accordingly, the second inflowing oxygen amount OSSVO2 at time t21 takes a last value X1 which is less than a peak value P1. On the other hand, since the peak inflowing oxygen amount OSCSVO2 is set to the peak value P1, the initial value A1 of the second inflowing oxygen amount OSSVO2 is calculated as (X1−P1) by equation (16). This calculation corresponds to a correction of the rich inflowing oxygen amount OSCR wherein the initial value of the rich inflowing oxygen amount OSCR is set to A1 instead of "0".

Further, since there is a time period, wherein the detected equivalent ratio KACT is less than "1.0" before time t22 at which the O2 sensor output SVO2 changes to a value indicative of the rich air-fuel ratio, the second inflowing oxygen amount OSSVO2 becomes greater than a peak value P2 (the absolute value of OSSVO2 becomes smaller than the absolute value of the peak value P2) at time t22 and takes a last value X2. The initial value A2 of the second inflowing oxygen amount OSSVO2 is calculated as (X2−P2) by equation (16). This calculation corresponds to a correction of the lean inflowing oxygen amount OSCL wherein the initial value of the lean inflowing oxygen amount OSCL is set to A2 instead of "0".

Thus, by correcting the initial value of the second inflowing oxygen amount OSSVO2, the inflowing oxygen amount can accurately be calculated when the characteristic of the O2 sensor 18 is deteriorated.

In this embodiment, the intake air flow rate sensor 7, the LAF sensor 17, and the O2 sensor 18, respectively, correspond to the intake air flow rate detecting means, the first oxygen concentration sensor, and the second oxygen concentration sensor. Further, the ECU 5 constitutes the inflowing oxygen amount calculating means, the air-fuel ratio switching control means, the rich operation oxygen amount calculating means, the lean operation oxygen amount calculating means, the correction amount calculating means, the peak rich operation oxygen amount calculating means, the peak lean operation oxygen amount calculating means, the rich operation oxygen amount correcting means, the lean operation oxygen amount correcting means, and the deterioration detecting means. Specifically, step S11 of FIG. 5 and step S117 of FIG. 11 correspond to the inflowing oxygen amount calculating means, steps S12 to S17; steps S19 to S29 of FIG. 5, steps S31 to S40 of FIG. 6, and the process of FIG. 8 correspond to the air-fuel ratio switching control means; steps S107, S108, S112, and S117 of FIG. 10 correspond to the rich operation oxygen amount calculating means; steps S109, S111, S112, and S117 of FIG. 10 correspond to the lean operation oxygen amount calculating means; steps S113 to S116 of FIG. 10 correspond to the correction amount calculating means; step S119 of FIG. 11 corresponds to the peak rich operation oxygen amount calculating means; step S120 of FIG. 11 corresponds to the peak lean operation oxygen amount calculating means; the point that the second inflowing oxygen amount OSSVO2 is reset by the equation (16) in step S112 of FIG. 10 corresponds to the rich operation oxygen amount correcting means and the lean operation oxygen amount correcting means; and steps S72 to S81 of FIG. 14 and steps S82 to S92 of FIG. 15 correspond to the deterioration detecting means.

The present invention is not limited to the embodiment described above and various modifications may be made. For example, in the embodiment described above, three-way catalysts 14a and 14b are contained in one container. Alternatively, the two catalysts may be contained in two separate containers. Further, even if the three-way catalyst is not provided downstream of the O2 sensor 18, the present invention is applicable. Even in such case, compared with the conventional technique, the present invention can reduce deterioration of the exhaust characteristics when performing the deterioration determination of the catalyst.

Further, in the embodiment described above, when performing the deterioration determination of the three-way catalyst 14a, the perturbation control of the air-fuel ratio is performed. The perturbation control may always be performed for maintaining the inflowing oxygen amount of the three-way catalyst 14a at the optimum level as shown in JP-'842. In this case, it is desirable to calculate the correction amount PO2C by reversing the O2 sensor output SVO2 at least twice with an appropriate time interval TCR and correct the detected equivalent ratio KACT with the calculated correction amount PO2C. It is further desirable that the time interval TCR is set to a smaller value as the intake air amount GAIR increases.

The present invention can be applied also to the air-fuel ratio control of a watercraft propulsion engine, such as an outboard engine having a vertically extending crankshaft. Further, the present invention is applicable to the deterioration determination of a catalyst for purifying exhaust gases provided in the exhaust system of such engine.

The present invention may be embodied in other specific forms without departing from the spirit or essential characteristics thereof. The above-disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An air-fuel ratio control system for an internal combustion engine having a catalyst provided in an exhaust system of said engine for purifying exhaust gases, said air-fuel ratio control system controlling an air-fuel ratio of an air-fuel mixture supplied to said engine and comprising:

intake air flow rate detecting means for detecting an intake air flow rate of said engine;

a first oxygen concentration sensor disposed upstream of said catalyst;

a second oxygen concentration sensor disposed downstream of said catalyst;

inflowing oxygen amount calculating means for calculating an amount of oxygen flowing into said catalyst according to an oxygen concentration detected by said first oxygen concentration sensor and the intake air flow rate detected by said intake air flow rate detecting means;

air-fuel ratio switching control means for alternately controlling the air-fuel ratio to a lean air-fuel ratio which is leaner than the stoichiometric ratio and a rich air-fuel ratio which is richer than the stoichiometric ratio according to a result of comparison between the inflowing oxygen amount calculated by said inflowing oxygen amount calculating means and target values of the inflowing oxygen amount;

rich operation oxygen amount calculating means for calculating a rich operation oxygen amount which indicates an amount of oxygen flowing into said catalyst during a time period from the time when the oxygen concentration detected by said first oxygen concentration sensor changes to a value indicative of a rich air-fuel ratio which is richer than the stoichiometric ratio to the time when an output of said second oxygen concentration sensor changes to a value indicative of the rich air-fuel ratio;

lean operation oxygen amount calculating means for calculating a lean operation oxygen amount which indicates an amount of oxygen flowing into said catalyst during a time period from the time when the oxygen concentration detected by said first oxygen concentration sensor changes to a value indicative of a lean air-fuel ratio which is leaner than the stoichiometric ratio to the time when the output of said second oxygen concentration sensor changes to a value indicative of the lean air-fuel ratio; and correction amount calculating means for calculating a correction amount for correcting the oxygen concentration detected by said first oxygen concentration sensor, based on the rich operation oxygen amount, the lean operation oxygen amount, and an accumulated value obtained by accumulating the intake air flow rate detected by said intake air flow rate detecting means, wherein said inflowing oxygen amount calculating means, said rich operation oxygen amount calculating means, and said lean operation oxygen amount calculating means use the oxygen concentration corrected with the correction amount to respectively calculate the inflowing oxygen amount, the rich operation oxygen amount, and the lean operation oxygen amount.

2. An air-fuel ratio control system according to claim 1, further comprising:

peak rich operation oxygen amount calculating means for calculating a peak rich operation oxygen amount which is a peak value of an amount of oxygen flowing into said catalyst during the time period from the time when the oxygen concentration detected by said first oxygen concentration sensor changes to a value indicative of the rich air-fuel ratio to the time when the output of said second oxygen concentration sensor changes to a value indicative of the rich air-fuel ratio;

peak lean operation oxygen amount calculating means for calculating a peak lean operation oxygen amount which is a peak value of an amount of oxygen flowing into said catalyst during the time period from the time when the oxygen concentration detected by said first oxygen concentration sensor changes to a value indicative of the lean air-fuel ratio to the time when the output of said second oxygen concentration sensor changes to a value indicative of the lean air-fuel ratio;

lean operation oxygen amount correcting means for correcting the lean operation oxygen amount with the rich operation oxygen amount and the peak rich operation oxygen amount; and rich operation oxygen amount correcting means for correcting the rich operation oxygen amount with the lean operation oxygen amount and the peak lean operation oxygen amount, wherein said correction amount calculating means calculates the correction amount using the corrected rich operation oxygen amount and the corrected lean operation oxygen amount.

3. An air-fuel ratio control system according to claim 1, further comprising deterioration detecting means for detecting a deterioration degree of said catalyst based on the output of said second oxygen concentration sensor during the operation of said air-fuel ratio switching control means.

4. An air-fuel ratio control system according to claim 1, wherein said air-fuel ratio switching control means changes a center air-fuel ratio of the air-fuel ratio switching control according to the correction amount.

5. An air-fuel ratio control method for an internal combustion engine having a catalyst provided in an exhaust system of said engine for purifying exhaust gases, a first oxygen concentration sensor disposed upstream of said catalyst, and a second oxygen concentration sensor disposed downstream of said catalyst, said air-fuel ratio control method controlling an air-fuel ratio of an air-fuel mixture supplied to said engine and comprising the steps of:

a) detecting an intake air flow rate of said engine;

b) calculating an amount of oxygen flowing into said catalyst according to an oxygen concentration detected by said first oxygen concentration sensor and the detected intake air flow rate;

c) alternately controlling the air-fuel ratio to a lean air-fuel ratio which is leaner than the stoichiometric ratio and a rich air-fuel ratio which is richer than the stoichiometric ratio according to a result of comparison between the calculated inflowing oxygen amount and target values of the inflowing oxygen amount;

d) calculating a rich operation oxygen amount which indicates an amount of oxygen flowing into said catalyst during a time period from the time when the oxygen concentration detected by said first oxygen concentration sensor changes to a value indicative of a rich air-fuel ratio which is richer than the stoichiometric ratio to the time when an output of said second oxygen concentration sensor changes to a value indicative of the rich air-fuel ratio;

e) calculating a lean operation oxygen amount which indicates an amount of oxygen flowing into said catalyst during a time period from the time when the oxygen concentration detected by said first oxygen concentration sensor changes to a value indicative of a lean air-fuel ratio which is leaner than the stoichiometric ratio to the time when the output of said second oxygen concentration sensor changes to a value indicative of the lean air-fuel ratio; and f) calculating a correction amount for correcting the oxygen concentration detected by said first oxygen concentration sensor, based on the rich operation oxygen amount, the lean operation oxygen amount, and an accumulated value obtained by accumulating the detected intake air flow rate, wherein the oxygen concentration corrected with the correction amount is used for calculating the inflowing oxygen amount, the rich operation oxygen amount, and the lean operation oxygen amount, respectively, in said steps b), d), and e).

6. An air-fuel ratio control method according to claim 5, further comprising the steps of:

g) calculating a peak rich operation oxygen amount which is a peak value of an amount of oxygen flowing into said catalyst during the time period from the time when the oxygen concentration detected by said first oxygen concentration sensor changes to a value indicative of the rich air-fuel ratio to the time when the output of said second oxygen concentration sensor changes to a value indicative of the rich air-fuel ratio;

h) calculating a peak lean operation oxygen amount which is a peak value of an amount of oxygen flowing into said catalyst during the time period from the time when the oxygen concentration detected by said first oxygen concentration sensor changes to a value indicative of the lean air-fuel ratio to the time when the output of said second oxygen concentration sensor changes to a value indicative of the lean air-fuel ratio;

i) correcting the lean operation oxygen amount with the rich operation oxygen amount and the peak rich operation oxygen amount; and j) correcting the rich operation oxygen amount with the lean operation oxygen amount and the peak lean operation oxygen amount, wherein the correction amount is calculated using the corrected rich operation oxygen amount and the corrected lean operation oxygen amount.

7. An air-fuel ratio control method according to claim 5, further comprising the step of detecting a deterioration degree of said catalyst based on the output of said second oxygen concentration sensor during execution of the air-fuel ratio switching control.

8. An air-fuel ratio control method according to claim 5, wherein a center air-fuel ratio of the air-fuel ratio switching control is changed according to the correction amount.

9. A computer program embodied on a computer-readable medium for causing a computer to implement an air-fuel ratio control method for an internal combustion engine having a catalyst provided in an exhaust system of said engine for purifying exhaust gases, a first oxygen concentration sensor disposed upstream of said catalyst, and a second oxygen concentration sensor disposed downstream of said catalyst, said air-fuel ratio control method controlling an air-fuel ratio of an air-fuel mixture supplied to said engine and comprising the steps of:

a) detecting an intake air flow rate of said engine;

b) calculating an amount of oxygen flowing into said catalyst according to an oxygen concentration detected by said first oxygen concentration sensor and the detected intake air flow rate;

c) alternately controlling the air-fuel ratio to a lean air-fuel ratio which is leaner than the stoichiometric ratio and a rich air-fuel ratio which is richer than the stoichiometric ratio according to a result of comparison between the calculated inflowing oxygen amount and target values of the inflowing oxygen amount;

d) calculating a rich operation oxygen amount which indicates an amount of oxygen flowing into said catalyst during a time period from the time when the oxygen concentration detected by said first oxygen concentration sensor changes to a value indicative of a rich air-fuel ratio which is richer than the stoichiometric ratio to the time when an output of said second oxygen concentration sensor changes to a value indicative of the rich air-fuel ratio;

e) calculating a lean operation oxygen amount which indicates an amount of oxygen flowing into said catalyst during a time period from the time when the oxygen concentration detected by said first oxygen concentration sensor changes to a value indicative of a lean air-fuel ratio which is leaner than the stoichiometric ratio to the time when the output of said second oxygen concentration sensor changes to a value indicative of the lean air-fuel ratio; and f) calculating a correction amount for correcting the oxygen concentration detected by said first oxygen concentration sensor, based on the rich operation oxygen amount, the lean operation oxygen amount, and an accumulated value obtained by accumulating the detected intake air flow rate, wherein the oxygen concentration corrected with the correction amount is used for calculating the inflowing oxygen amount, the rich operation oxygen amount, and the lean operation oxygen amount, respectively, in said steps b), d), and e).

10. A computer program according to claim 9, wherein said air-fuel ratio control method further comprises the steps of:

g) calculating a peak rich operation oxygen amount which is a peak value of an amount of oxygen flowing into said catalyst during the time period from the time when the oxygen concentration detected by said first oxygen concentration sensor changes to a value indicative of the rich air-fuel ratio to the time when the output of said second oxygen concentration sensor changes to a value indicative of the rich air-fuel ratio;

h) calculating a peak lean operation oxygen amount which is a peak value of an amount of oxygen flowing into said catalyst during the time period from the time when the oxygen concentration detected by said first oxygen concentration sensor changes to a value indicative of the lean air-fuel ratio to the time when the output of said second oxygen concentration sensor changes to a value indicative of the lean air-fuel ratio;

i) correcting the lean operation oxygen amount with the rich operation oxygen amount and the peak rich operation oxygen amount; and j) correcting the rich operation oxygen amount with the lean operation oxygen amount and the peak lean operation oxygen amount, wherein the correction amount is calculated using the corrected rich operation oxygen amount and the corrected lean operation oxygen amount.

11. A computer program according to claim 9, wherein said air-fuel ratio control method further comprises the step of detecting a deterioration degree of said catalyst based on the output of said second oxygen concentration sensor during execution of the air-fuel ratio switching control.

12. A computer program according to claim 9, wherein a center air-fuel ratio of the air-fuel ratio switching control is changed according to the correction amount.

\* \* \* \* \*